United States Patent
Sugimoto

(10) Patent No.: US 11,714,585 B2
(45) Date of Patent: Aug. 1, 2023

(54) IMAGE FORMING APPARATUS CONFIGURED TO PERFORM AUTHENTICATION TO ENABLE AN OPERATION FOR AN AUTHORIZED USER

(71) Applicant: TOSHIBA TEC KABUSHIKI KAISHA, Tokyo (JP)

(72) Inventor: Shinya Sugimoto, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/674,813

(22) Filed: Feb. 17, 2022

(65) Prior Publication Data

US 2022/0382494 A1    Dec. 1, 2022

(30) Foreign Application Priority Data

Jun. 1, 2021  (JP) ................... 2021-092223

(51) Int. Cl.
*G06F 3/12* (2006.01)
*G06F 21/32* (2013.01)
(Continued)

(52) U.S. Cl.
CPC .......... *G06F 3/1238* (2013.01); *G06F 3/1222* (2013.01); *G06F 21/32* (2013.01);
(Continued)

(58) Field of Classification Search
None
See application file for complete search history.

(56) References Cited

U.S. PATENT DOCUMENTS 6,701,095 B1    3/2004 Fujimoto et al.
2009/0006652 A1*  1/2009 Kasatani ............ H04N 1/00204
                                                          709/248
(Continued)

FOREIGN PATENT DOCUMENTS

JP    2005-051336 A       2/2005
JP    2007102426 A    *  4/2007
JP    2007-193138 A       8/2007

OTHER PUBLICATIONS

English translation of JP-2007102426-A. (Year: 2007).*

*Primary Examiner* — Thomas D Lee
(74) *Attorney, Agent, or Firm* — Kim & Stewart LLP

(57) ABSTRACT

An image forming apparatus includes a memory that stores identification information of authorized users in association with biometric information thereof, a reading device configured to read identification information from a medium, an input device through which biometric information is input, and a processor configured to, upon receipt of one of identification and biometric information, perform a first authentication by determining whether said one of identification and biometric information is stored, when said one of identification and biometric information is stored, upon receipt of the other of identification and biometric information, perform a second authentication by determining whether the other of identification and biometric information is stored in association with said one of identification and biometric information, and when the other of identification and biometric information is stored, enable a first operation that can be performed for the corresponding authorized user.

18 Claims, 15 Drawing Sheets

(51) Int. Cl.
*H04N 1/00* (2006.01)
*G06F 21/60* (2013.01)

(52) U.S. Cl.
CPC ....... *G06F 21/608* (2013.01); *H04N 1/00381* (2013.01); *H04N 1/00403* (2013.01)

(56) References Cited

U.S. PATENT DOCUMENTS

| | | | |
|---|---|---|---|
| 2010/0142989 A1* | 6/2010 | Oak | G03G 21/02 |
| | | | 399/80 |
| 2016/0165077 A1* | 6/2016 | Shibata | G06F 3/1257 |
| | | | 358/1.15 |
| 2018/0075032 A1* | 3/2018 | Kimura | G06F 1/3287 |
| 2021/0029113 A1* | 1/2021 | Tomita | G06F 21/32 |
| 2021/0406349 A1* | 12/2021 | Akiyama | G06F 21/32 |
| 2022/0277069 A1* | 9/2022 | Yokomizo | G06F 21/31 |

\* cited by examiner

| Registered person ID | Registered person voice information |
|---|---|

| Registered person ID | Information processing apparatus name | Job name | Creation date and time | Number of sheets |
|---|---|---|---|---|

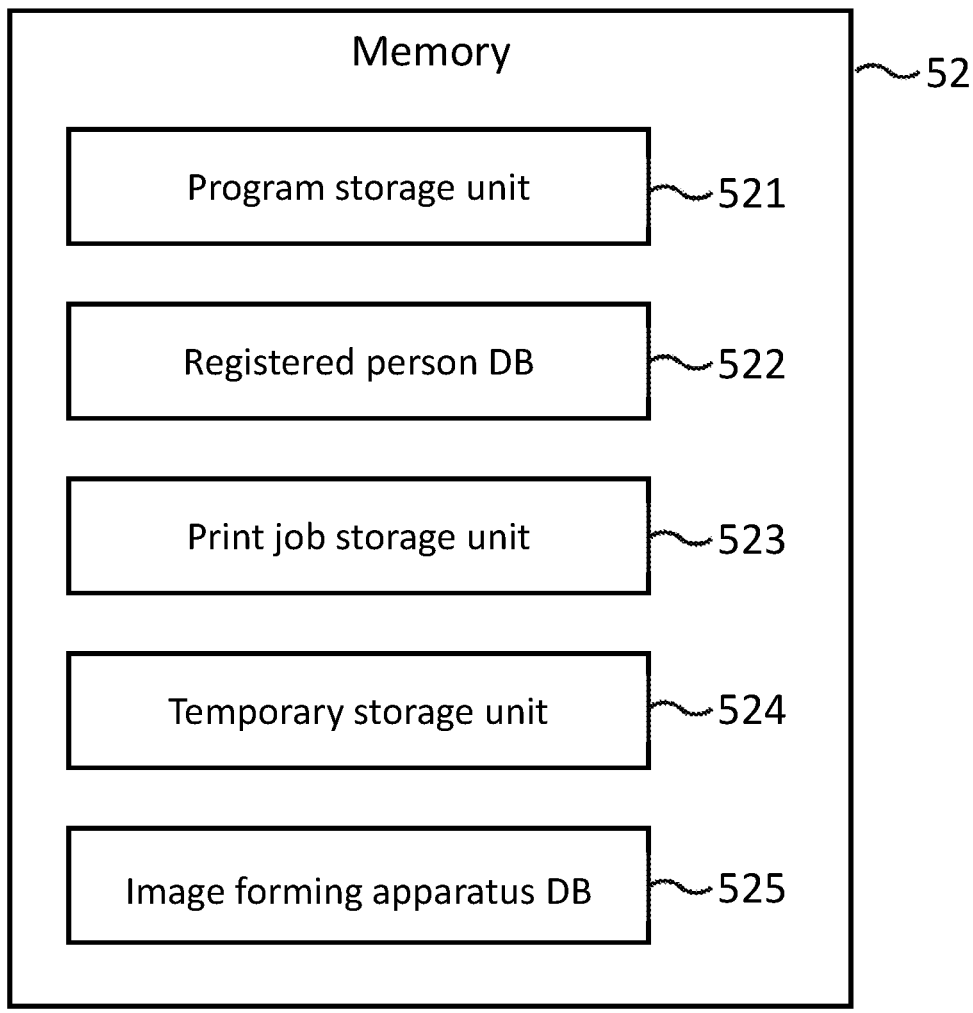

IMAGE FORMING APPARATUS CONFIGURED TO PERFORM AUTHENTICATION TO ENABLE AN OPERATION FOR AN AUTHORIZED USER

CROSS-REFERENCE TO RELATED APPLICATIONS

This application is based upon and claims the benefit of priority from Japanese Patent Application No. 2021-092223, filed Jun. 1, 2021, the entire contents of which are incorporated herein by reference.

FIELD

Embodiments described herein relate generally to an image forming apparatus, an image forming system, and a method carried out by the image forming system.

BACKGROUND

Image forming apparatuses that execute printing on media based on print jobs issued by various client terminals, e.g., PCs, smartphones, tablets, and the like (hereinafter simply referred to as the clients) are known. The image forming apparatuses and clients are connected via a network. In such a case, the user of a client selects an image forming apparatus to execute printing and operates the client to transmit a print job to the selected image forming apparatus. The selected image forming executes printing based on the print job after authenticating the user with a mobile device, such as an IC card or a smartphone, possessed by the user.

Installation of image forming apparatuses in high security areas with an entrance/exit gate through which only users who have been authenticated by using their mobile devices can pass is also common.

However, such an authentication scheme cannot prevent an unauthorized user who has managed to obtain (or alternatively "spoof") a mobile terminal of an authorized user from, improperly accessing the image forming apparatuses.

BRIEF DESCRIPTION OF THE DRAWINGS

FIG. 12 depicts data stored in a memory of a server device.

FIG. 13 depicts a data structure of a record of an image forming apparatus database stored in a memory.

DETAILED DESCRIPTION

In general, according to one embodiment, an image forming apparatus includes a memory that stores identification information of authorized users in association with biometric information thereof, a reading device configured to read identification information from a medium, an input device through which biometric information is input, and a processor. The processor is configured to, upon receipt of one of identification information and biometric information, perform a first authentication by determining whether said one of identification information and biometric information is stored in the memory, when said one of identification information and biometric information is stored in the memory, upon receipt of the other of identification information and biometric information, perform a second authentication by determining whether the other of identification information and biometric information is stored in the memory in association with said one of identification information and biometric information, and when the other of identification information and biometric information is stored in the memory in association with said one of identification information and biometric information, enable a first operation that can be performed for the corresponding authorized user.

A control device according to one or more embodiments will be described below with reference to the drawings.

Figure 1:
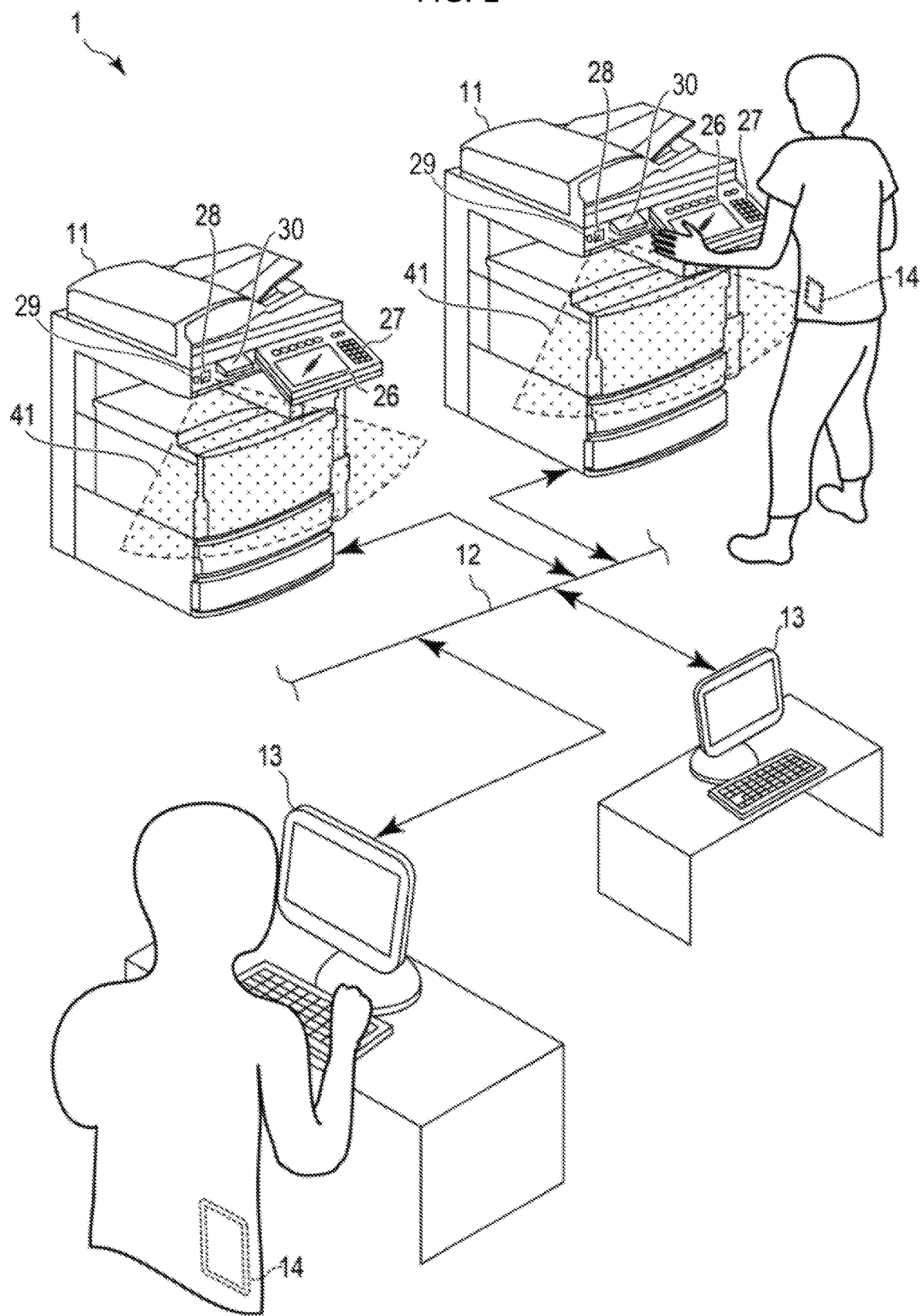
FIG. 1 is a diagram of an image forming system including an image forming apparatus to which a control device according to a first embodiment is applied.

FIG. 1 is an explanatory diagram of an image forming system 1 to which a control device according to a first embodiment is applied.

The image forming system 1 includes a plurality of image forming apparatuses 11 to which the control device according to the first embodiment is applied. The plurality of image forming apparatuses 11 are connected via a network 12. Further, a plurality of information processing apparatuses as a plurality of clients are also connected to the network 12. That is, the image forming apparatus 11 and the information processing apparatus 13 can communicate with each other via the network 12. The plurality of image forming apparatuses 11 can also communicate with each other via the network 12. Each user who operates the information processing apparatus 13 has a mobile device 14. The image forming apparatus 11 and the mobile device 14 can communicate with each other by wireless communication.

First, the configuration of the image forming system 1 will be described. The information processing apparatus 13 is a client terminal that issues a print job to the image forming apparatus 11. The information processing apparatus 13 is a device such as a personal computer (PC), a laptop PC, a smartphone, or a tablet PC.

The information processing apparatus 13 comprises a display, an operation interface, a communication interface, and a system controller (not shown).

The display displays a screen according to input video signals.

The operation interface includes various user interfaces such as a keyboard and a pointing device. The operation interface outputs an operation signal corresponding to a user operation to the system controller.

The communication interface is a network interface circuit that communicates with the image forming apparatus 11 via the network 12.

The system controller controls the information processing apparatus 13. The system controller includes, for example, a processor and a memory.

The processor is an arithmetic element (for example, a Central Processing Unit (CPU)) that executes arithmetic processing.

The memory is a storage device that stores programs, data used in the programs, and the like. The memory temporarily stores data being processed by the processor. The memory includes a non-volatile memory and a volatile memory.

The processor executes various processes according to the programs stored in the memory. For example, the processor executes a process of generating a print job for printing and transmitting the generated print job to one of the image forming apparatuses 11.

The mobile device 14 is a device for personal identification (or authentication) that executes wireless communication with the image forming apparatus 11. The mobile device 14 is a mobile device such as an IC card, a smartphone, a tablet PC, or a wireless communication tag. In this example, it is assumed that the user carries an IC card capable of short-range wireless communication.

The mobile device 14 comprises a communication interface and a system controller.

The communication interface is a network interface circuit that communicates with the image forming apparatus 11 by wireless communication. The wireless communication scheme is, for example, short-range wireless communication defined in ISO/IEC14443 or ISO/IEC18092, Wi-Fi®, Wi-Fi Direct®, Bluetooth Low Energy®, or the like. Any other communication method may be used for wireless communication between the mobile device 14 and the image forming apparatus 11.

The system controller controls the mobile device 14. The system controller includes, for example, a processor and a memory.

The processor is an arithmetic element (for example, a CPU) that executes arithmetic processing.

The memory is a storage device that stores programs, data used in the programs, and the like. The memory temporarily stores data being processed by the processor. The memory is a non-volatile memory.

Next, a configuration example of the image forming apparatus 11 will be described. The image forming apparatus 11 is, for example, a multifunction printer (MFP) that executes various processes such as image formation while conveying a recording medium such as a print medium. The image forming apparatus 11 is, for example, a solid-state scanning printer (for example, an LED printer) that scans an LED array that executes various processes such as image formation while conveying a recording medium such as a print medium. The image forming apparatus 11 may be an inkjet printer that scans an inkjet head that ejects ink, or another type of printer.

The image forming apparatus 11 forms an electrostatic latent image on a photosensitive drum by charging the photosensitive drum and irradiating the photosensitive drum with light corresponding to image data for printing. The image forming apparatus 11 attaches toner to a latent image formed on the photosensitive drum, and transfers the toner attached to the latent image to a print medium to form a toner image on the print medium. Further, the image forming apparatus 11 applies heat and pressure to the printing medium to which the toner image has been transferred, thereby fixing the toner image on the printing medium.

Figure 2:
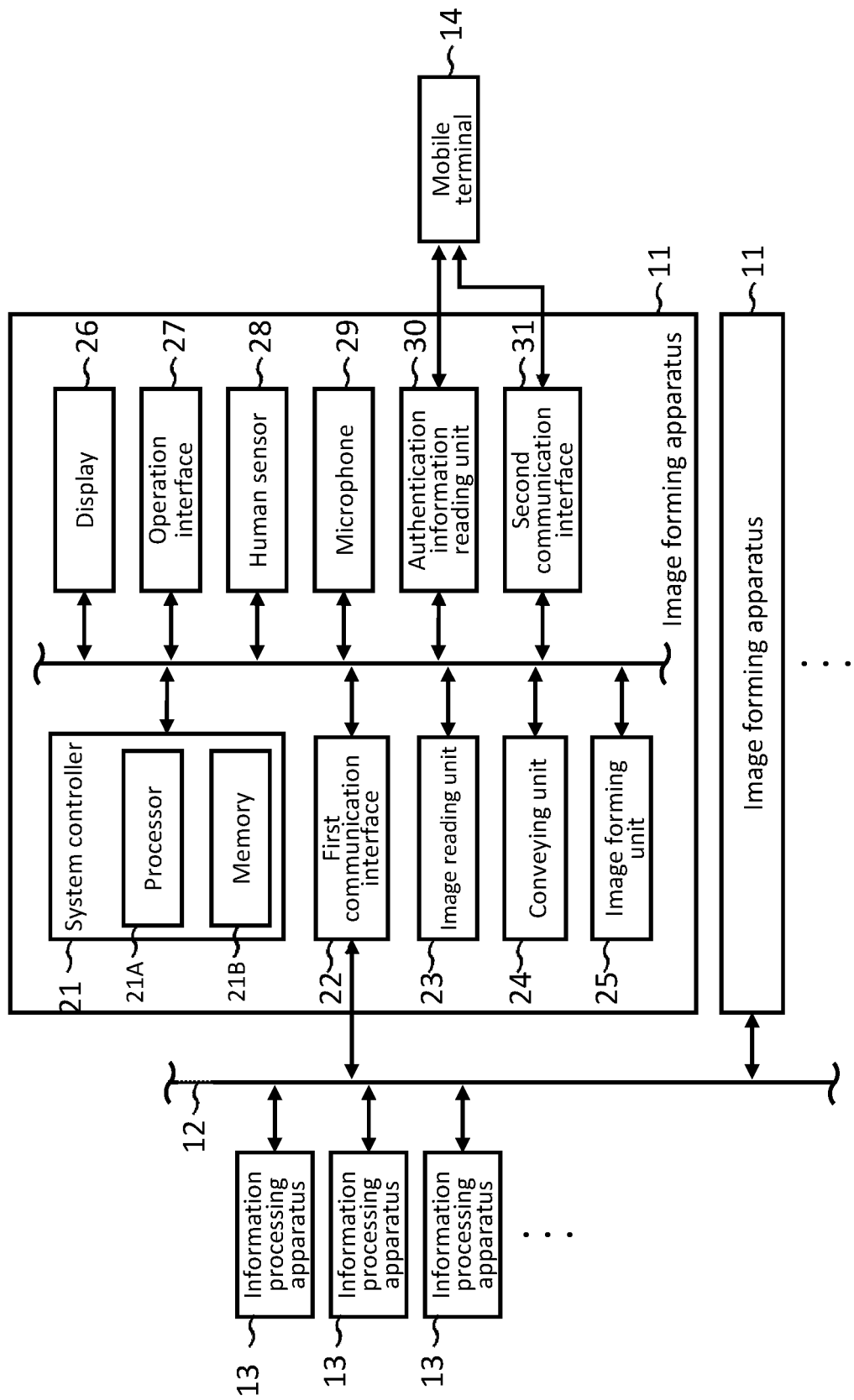
FIG. 2 is a hardware block diagram of an image forming apparatus.

FIG. 2 is a hardware block diagram of the image forming apparatus 11. The image forming apparatus 11 includes a system controller 21, a first communication interface 22, an image reading unit 23, a conveying unit 24, an image forming unit 25, a display 26, an operation interface 27, a human sensor 28, a microphone 29, an authentication information reading unit 30, and a second communication interface 31. The system controller 21, the first communication interface 22, the image reading unit 23, the conveying unit 24, the image forming unit 25, the display 26, the operation interface 27, the human sensor 28, the microphone 29, the authentication information reading unit 30, and the second communication interface 31 are housed in a housing.

The system controller 21 controls the image forming apparatus 11. The system controller 21 comprises, for example, a processor 21A and a memory 21B.

The processor 21A is an arithmetic element (for example, a CPU) that executes arithmetic processing. The processor 21A executes various types of processing according to programs stored in the memory 21B.

The memory 21B is a storage device that stores programs and data used by the programs. Further, the memory 21B temporarily stores data being processed by the processor 21A. The memory 21B includes a non-volatile memory and a volatile memory.

The first communication interface 22 is a network interface circuit that communicates with the information processing apparatus 13 and another image forming apparatus 11 via the network 12.

The image reading unit 23 is configured to read an image from a document. The image reading unit 23 includes, for example, a scanner and an automatic document feeder (ADF). The scanner reads the document disposed on a document placement glass plate. For example, the image reading unit 23 acquires the entire image of a document by continuously moving the scanner and acquiring the image by the scanner. For example, the image reading unit 23 obtains the entire image of a document by conveying the document through a reading position of the scanner by the ADF and obtaining the image by the scanner.

The conveying unit 24 is configured to convey a medium (e.g., a printing medium) for printing to the image forming unit 25 and discharge the medium on which an image is formed by the image forming unit 25 from the housing. The conveying unit 24 conveys the print media stored in a paper feed cassette one by one to the image forming unit 25. The conveying unit 24 discharges the print medium on which the image is formed by the image forming unit 25 to a discharge tray outside the housing.

The image forming unit 25 forms an image on a print medium under the control of the system controller 21. The image forming unit 25 includes a process unit, an exposure device, a transfer mechanism, and a fixing device.

The process unit includes the photosensitive drum, a charger, and a developing device. The photosensitive drum includes a cylindrical drum and a photosensitive layer formed on the outer peripheral surface of the drum. The photosensitive drum is rotated at a constant speed by a driving mechanism (not illustrated).

The charger uniformly charges the surface of the photosensitive drum. For example, the electrostatic charger charges the photosensitive drum to a uniform negative potential by applying a voltage to the photosensitive drum using a charging roller.

The developing device causes toner to adhere to the photosensitive drum. The developing device includes a developer container, a stirring mechanism, a developing roller, a doctor blade, and the like.

The developer container receives and stores toner sent out from a toner cartridge. A carrier is stored in the developer container in advance. The toner fed from the toner cartridge is stirred with the carrier by the stirring mechanism to form a developer in which the toner and the carrier are mixed. The carrier is stored in the developer container when the developing device is manufactured.

The developing roller causes the developer to adhere to the surface thereof by rotating in the developer container. A doctor blade is disposed at a predetermined distance from the surface of the developing roller. The doctor blade removes a part of the developer adhering to the surface of the rotating developing roller. Thus, a layer of the developer having a thickness corresponding to the distance between the doctor blade and the surface of the developing roller is formed on the surface of the developing roller.

The exposure device includes a plurality of light emitting elements. The exposure device forms a latent image on the photosensitive drum by irradiating the charged photosensitive drum with light from the light emitting elements. The light emitting element is, for example, a light emitting diode (LED). One light-emitting element is configured to irradiate one point on the photosensitive drum with light. The plurality of light emitting elements are arranged along a main scanning direction, which is a direction parallel to the rotation axis of the photosensitive drum.

The exposure device forms a latent image for one line on the photosensitive drum by irradiating the photosensitive drum with light from a plurality of light emitting elements arranged in a main scanning direction. Furthermore, the exposure device continuously irradiates the rotating photosensitive drum with light to form latent images of a plurality of lines.

In the above configuration, when the surface of the photosensitive drum charged by the charger is irradiated with light from the exposure device, an electrostatic latent image is formed. When the layer of the developer formed on the surface of the developing roller approaches the surface of the photosensitive drum, the toner contained in the developer adheres to the latent image formed on the surface of the photosensitive drum. Thus, a toner image is formed on the surface of the photosensitive drum.

The transfer mechanism is configured to transfer the toner image formed on the surface of the photosensitive drum to the print medium. The transfer mechanism includes a primary transfer belt, a secondary transfer roller, and a plurality of other rollers. The transfer mechanism receives the toner image formed on the surface of the photosensitive drum on the outer peripheral surface of the primary transfer belt. The transfer mechanism transports the toner image on the outer peripheral surface of the primary transfer belt to a transfer nip where the secondary transfer roller contacts the outer peripheral surface of the primary transfer belt. The transfer mechanism transfers the toner image on the outer peripheral surface of the first transfer belt to the print medium conveyed by the conveying unit 24 by causing the print medium to pass through the transfer nip.

The fixing device is configured to fix the toner image transferred onto the print medium onto the print medium. The fixing device includes a heating member (e.g., a heat roller) that applies heat to the print medium, a pressing member (e.g., a press roller) that applies pressure to the print medium, and a heater that heats the heat roller. The press roller applies pressure to the heat roller to form a fixing nip where the press roller contacts the heat roller. The fixing device applies heat and pressure to the print medium to which the toner image has been transferred by the transfer mechanism by causing the print medium to pass through the fixing nip. Thus, the fixing device fixes the toner image formed on the print medium. After passing through the fixing nip, the conveying unit 24 ejects the print medium onto the discharge tray.

The display 26 displays a screen according to video signals input from the system controller 21 or a display control unit such as a graphics controller (not illustrated). For example, the display 26 displays a screen for various settings of the image forming apparatus 11.

The operation interface 27 includes various user interfaces. The operation interface 27 outputs an operation signal corresponding to a user operation to the system controller 21. The operation member is, for example, a touch sensor, a numerical keypad, a power key, a paper feed key, various function keys, or a keyboard. The touch sensor is, for example, a resistive film-type touch sensor, a capacitance-type touch sensor, or the like. The touch sensor acquires information indicating a position designated in a certain region. The touch sensor is configured as a touch panel integrally with the display 26, and inputs a signal indicating a touched position on a screen displayed on the display 26 to the system controller 21.

The human sensor 28 is a sensor that detects whether a user is present near the image forming apparatus 11. As illustrated in FIG. 1, the human sensor 28 detects the presence or absence of a user in a predetermined detection range 41 near the housing of the image forming apparatus 11. The human sensor 28 outputs a detection result to the system controller 21. The human sensor 28 is, for example, a reflection-type sensor including a light emitting element such as an LED that outputs light and a photodiode that detects reflected light of light from the light emitting element. The human sensor 28 may include a camera including an imaging element and an optical system that forms an image of light from a passage near the image forming apparatus 11 on the imaging element, and may be configured to detect a nearby user by analyzing the image acquired by the camera.

The microphone 29 is a sensor that acquires data of voice (hereinafter simply referred to as "voice") uttered by the user. The voice is biometric information capable of identifying the user. Although the microphone 29 is not limited thereto, as illustrated in FIG. 1, the microphone 29 is disposed near the human sensor 28, for example.

The authentication information reading unit 30 is an interface for communicating with the mobile device 14 carried by the user. For example, the authentication information reading unit 30 is an IC card reader that executes wireless communication with the IC card possessed by a user. The authentication information reading unit 30 communicates with the IC card by short-range wireless communication defined by ISO/IEC14443 or ISO/IEC18092, for example.

The second communication interface 31 is a network interface circuit for communicating with the mobile device 14 carried by the user. For example, the second communication interface 31 executes wireless communication with the mobile device 14 carried by the user by Wi-Fi®, Wi-Fi Direct®, Bluetooth Low Energy® or other wireless communication methods. The second communication interface 31 is necessary when the mobile device 14 is not an IC card but a mobile device such as a smartphone, a tablet PC, or a wireless communication tag. That is, when only an IC card is used as the mobile device 14, the image forming apparatus 11 does not need to have the second communication interface 31.

Figures 3, 4, 5:
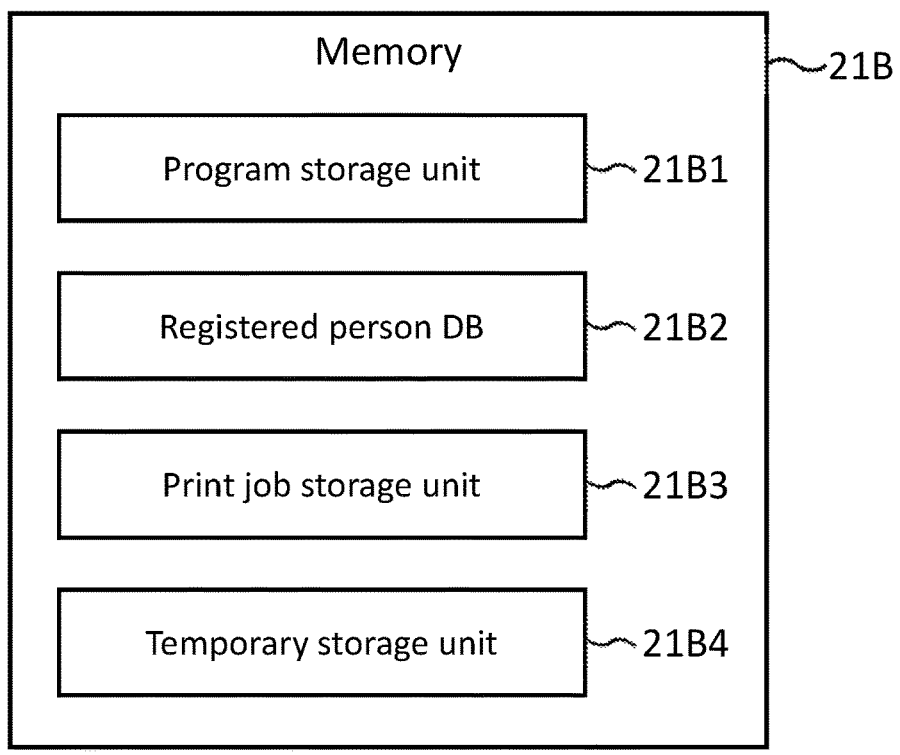
FIG. 3 depicts data stored in a memory included in an image forming apparatus.
FIG. 4 depicts a data structure of a record of a registered person database stored in a memory.
FIG. 5 depicts a data structure of management data for each print job stored in a print job storage unit included in a memory.

FIG. 3 depicts data stored in the memory 21B. The memory 21B includes a program storage unit 21B1, a registered person database (DB) 21B2, a print job storage unit 21B3, and a temporary storage unit 21B4. The program storage unit 21B1, the registered person DB 21B2, and the print job storage unit 21B3 are included or stored in the non-volatile memory, and the temporary storage unit 21B4 is included or stored in the volatile memory.

The program storage unit 21B1 stores one or more programs for causing the processor 21A to perform the functions of the image forming apparatus 11. The programs includes a control program for causing the processor 21A to execute an operation as the control device according to the first embodiment.

The registered person DB 21B2 stores information of registered persons who use the image forming apparatus 11. FIG. 4 depicts a data structure of a record for each registered person in the registered person DB 21B2. Each record includes a registered person ID and registered person voice information. The registered person ID is identification information for uniquely identifying the mobile device 14. The registered person ID may be identification information for the mobile device 14, or may be identification information for the registered person such as an employee number. The registered person voice information is a recording of a voice uttered by the registered person, and may be, for example, a voice of a prescribed keyword such as "print". The registered person voice information may include a plurality of keywords.

These registered person ID and registered person voice information can be stored as a record in the registered person DB 21B2 by being input in the image forming apparatus 11, as described later. Further, for example, the registered person ID and the registered person voice information may be transmitted from the information processing apparatus 13 to the image forming apparatus 11 via the network 12 and stored as a record in the registered person DB 21B2. In such a case, if necessary, the information processing apparatus 13 may include a card reader that reads the registered person ID from the IC card as the mobile device 14 and a microphone that acquires the voice of the registered person.

Although not particularly shown, the record of the registered person DB 21B2 may include other information items. For example, the record can include storage destination information indicating a storage destination such as a folder of the information processing apparatus 13 that stores images acquired by the scanner function of the image forming apparatus 11.

The print job storage unit 21B3 stores print jobs transmitted from the information processing apparatus 13 via the network 12. That is, the information processing apparatus 13 generates a print job for causing the image forming apparatus 11 to execute printing, and transmits the generated print job to any image forming apparatus 11. When an executable print job is received, the processor 21A of the image forming apparatus 11 stores the received print job in the print job storage unit 21B3. After the processor 21A executes printing based on the print job, the processor 21A deletes the print job from the print job storage unit 21B3.

The print job includes image data representing an image to be formed on a print medium and management data including various types of information. FIG. 5 depicts a data structure of the management data for each print job stored in the print job storage unit 21B3. The management data includes information of a registered person ID, an information processing apparatus name, a job name, a creation date and time, and the number of sheets.

As described above, the registered person ID is identification information for uniquely identifying the mobile device 14. When generating a print job, the information processing apparatus 13 adds the registered person ID associated with a logged-in registered person to the print job. The computer name is identification information for identifying the information processing apparatus 13 that has generated the print job. The job name is information indicating a file used to generate the print job. The creation date and time is information indicating date and time when the information processing apparatus 13 generates the print job. The number of sheets is information indicating the number of sheets to be printed by the image forming apparatus 11. The number of sheets may include, for example, information such as the number of sheets per copy (number of pages) and the number of copies (number of page sets). The number of print sheets may include information indicating a size of a print medium for each page. The number of sheets may include information indicating whether color printing or monochrome printing is executed.

The temporary storage unit 21B4 temporarily stores data being processed in the processor 21A.

Figure 6:
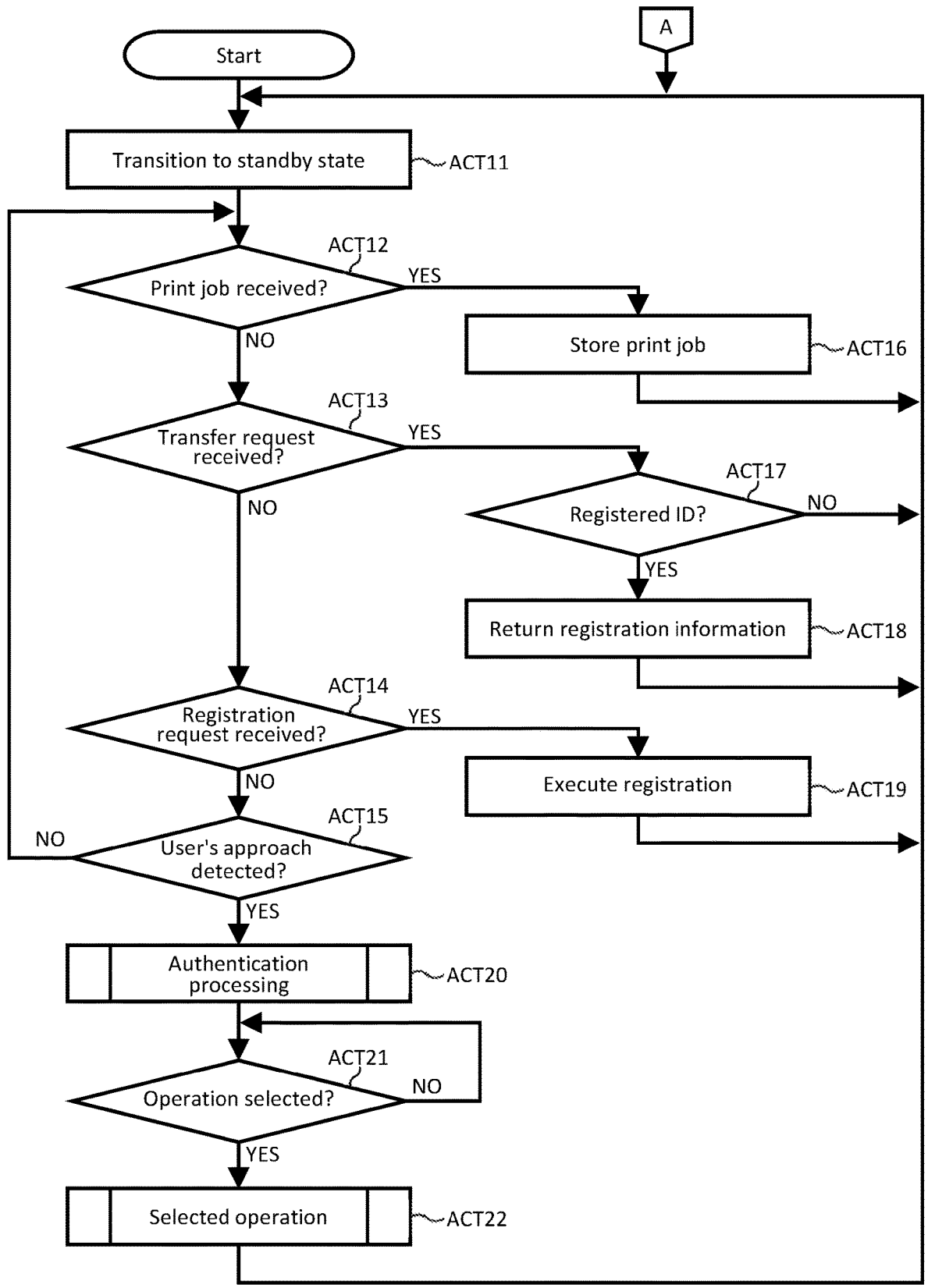
FIG. 6 is a flowchart of an operation of an image forming apparatus.

FIG. 6 is a flowchart of an operation of the image forming apparatus 11. When the power of the image forming apparatus 11 is turned on and the processor 21A of the image forming apparatus 11 is activated, the processor 21A executes the operation shown in this flowchart according to the program stored in the program storage unit 21B1.

First, the processor 21A of the image forming apparatus 11 causes the image forming apparatus 11 to transition to a standby state (ACT11). In this standby state, for example, the first communication interface 22 and the human sensor 28 are operable.

Thereafter, the processor 21A determines whether the first communication interface 22 has received a print job from any of the information processing apparatuses 13 (ACT12). When it is determined that a print job has not been received (ACT12, NO), the processor 21A determines whether a transfer request has been received from another image forming apparatus 11 via the first communication interface 22 (ACT13). When it is determined that the transfer request has not been received (ACT13, NO), the processor 21A determines whether a registration request has been received from any of the information processing apparatuses 13 by the first communication interface 22 (ACT14). When it is determined that the registration request has not been received (ACT14, NO), the processor 21A determines whether an approach of a user has been detected (ACT15). For example, when the human sensor 28 detects a user in the vicinity of the image forming apparatus 11, the processor 21A determines that the user is approaching. When it is determined that an approach of a user has not been detected (ACT15, NO), the processor 21A proceed to ACT12. In this way, the processor 21A waits for any event to occur.

When it is determined that a print job has been received (ACT12, YES), the processor 21A stores the received print job in a print job storage 21B3 in the memory 21B (ACT16). Then, the processor 21A shifts to ACT11.

When it is determined that a transfer request is received (ACT13, YES), the processor 21A determines whether the registered person ID included in the transfer request has already been registered in the registered person DB 21B2 (ACT17). When it is determined that the corresponding registered person ID has not been registered (ACT17, NO), the processor 21A shifts to ACT11. When it is determined that the corresponding registered person ID has already been registered (ACT17, YES), the processor 21A transmits the registration information for the corresponding registered person ID, that is, the registered person ID and the registered person voice information, to the image forming apparatus 11 of the request source via the first communication interface 22 (ACT18). Then, the processor 21A shifts to ACT11.

If the processor 21A determines that a registration request has been received (ACT14, YES), the processor 21A executes registration (ACT19). That is, the processor 21A registers the registered person ID and the registered person voice information, which are registration information included in the registration request or transmitted following the registration request, in the registered person DB 21B2. Then, the processor 21A shifts to ACT11.

When it is determined that a user is approaching (ACT15, YES), the processor 21A operates as the control device according to the first embodiment and executes an authentication processing (ACT20). In the authentication processing, as will be described later in detail, the processor 21A confirms whether a user who has approached the image forming apparatus 11 (hereinafter referred to as an approaching user) is a user corresponding to registration information registered in the registered person DB 21B2, that is, a registered person. In the case of the registered person, the processor 21A controls the display 26 to display an operation selection screen for the registered person to select which function of the image forming apparatus 11 is to be operated.

The processor 21A determines which operation is selected by the authenticated registered person through the operation interface 27 (ACT21). When it is determined that the registered person has not selected an operation, (ACT21, NO), the processor 21A repeats ACT21. The processor 21A thus waits for the registered person to select an operation. If the registered person does not select any operation even after the predetermined time elapses, the processor 21A may shift to ACT11. Further, the processor 21A also shifts to ACT11 in a case where a cancel operation is executed by the registered person. The cancel operation includes, for example, in addition to an explicit cancel operation by the operation interface 27 corresponding to a "return" button displayed on the selection screen, an implicit cancel operation in which an approaching user has moved away from the image forming apparatus 11 and the approach of the user is no longer detected by the human sensor 28.

In a case where it is determined that the registered person selects an operation (ACT21, YES), the processor 21A executes the operation corresponding to the selection of the registered person (ACT22). For example, when the print operation is selected, the processor 21A executes printing based on the print job of the corresponding registered person stored in the print job storage unit 21B3. Then, the processor 21A shifts to ACT11.

Figure 7:
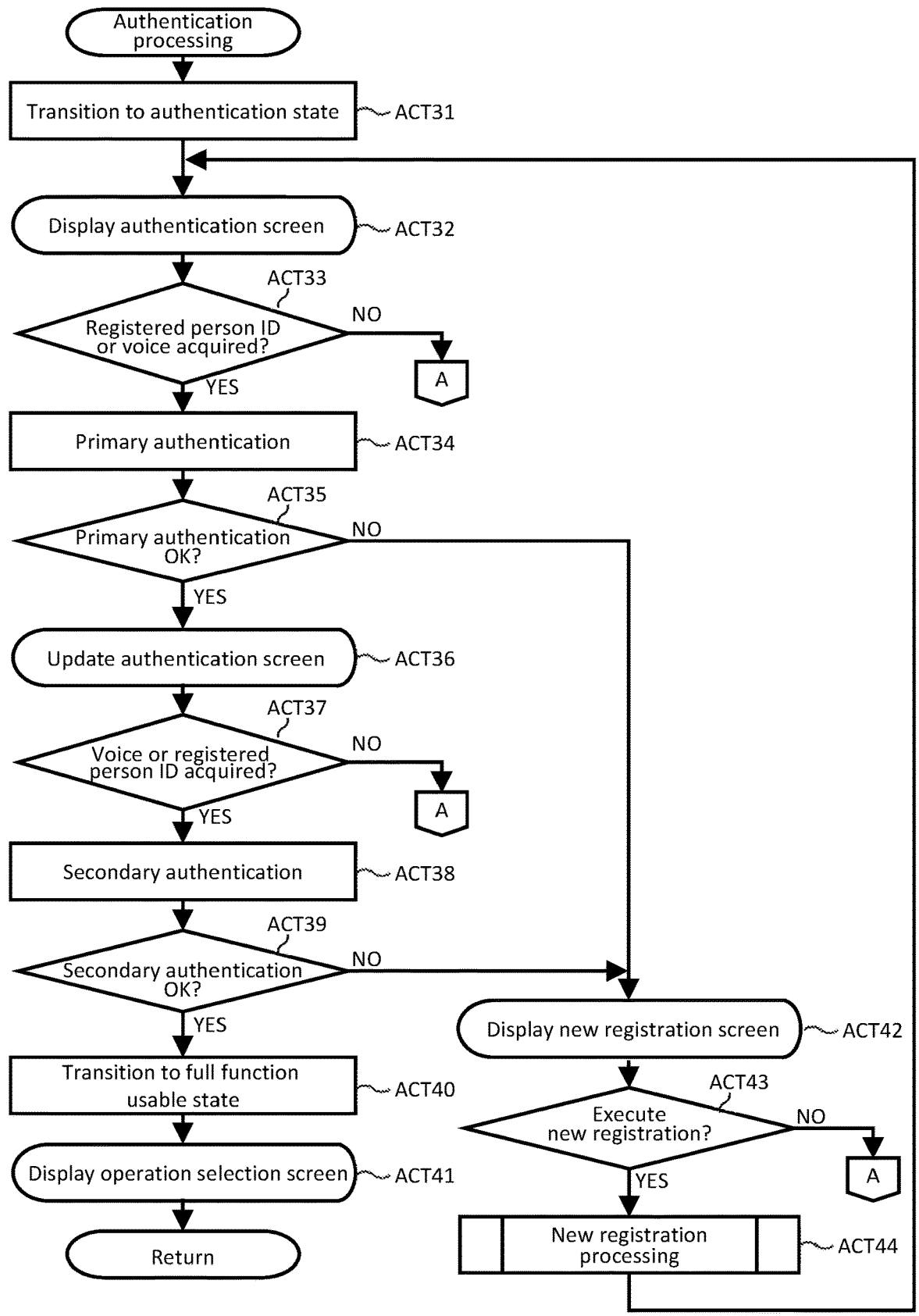
FIG. 7 is a flowchart of an authentication processing executed by a control device according to a first embodiment.

FIG. 7 is a flowchart of the ACT20 authentication processing.

First, the processor 21A causes the image forming apparatus 11 to transition to an authentication state (ACT31). In this authentication state, for example, the microphone 29 and the authentication information reading unit 30 are operable in addition to the first communication interface 22 and the human sensor 28.

The processor 21A controls the display 26 to display an authentication screen (ACT32). The authentication screen may include a message that prompts the approaching user to both hold the mobile device 14 configured as an IC card over the reading range of the authentication information reading unit 30 and to speak a keyword. When the approaching user confirms the authentication screen and holds the mobile device 14 configured as an IC card over the reading range of the authentication information reading unit 30, the authentication information reading unit 30 can acquire the registered person ID from the mobile device 14. The microphone 29 is capable of acquiring the voice of the approaching user. In a case where the processor 21A acquires any information, the processor 21A temporarily stores the information in the temporary storage unit 21B4 of the memory 21B, and in a case where the information is used in the subsequent processing, the information temporarily stored in the temporary storage unit 21B4 is used.

The processor 21A determines whether the registered person ID or voice has been acquired (ACT33). If the registered person ID or voice has not been acquired even after a predetermined period of time has elapsed, or if it is determined that a cancel operation has been executed (ACT33, NO), the processor 21A proceeds to ACT11. Examples of the cancel operation include an explicit cancel operation in which the operation interface 27 corresponding to the "return" button displayed on the authentication screen is operated and an implicit cancel operation in which the approaching user has moved away from the image forming apparatus 11.

When it is determined that the registered person ID or voice has been acquired (ACT33, YES), the processor 21A executes primary authentication based on the acquired information (ACT34). In the primary authentication, for example, if the registered person ID has been acquired, the processor 21A searches the registered person DB 21B2 to determine whether the registered person ID corresponding to the acquired registered person ID is registered. If the voice has been acquired, the processor 21A determines whether registered person voice information corresponding to the acquired voice is registered in the registered person DB 21B2.

The processor 21A determines whether the primary authentication result is authentication OK (ACT35). The processor 21A determines that authentication is OK if the registered person ID or registered person voice information corresponding to the acquired registered person ID or voice is registered in the registered person DB 21B2. When it is determined that the primary authentication result is not authentication OK, that is, authentication NG, (ACT35, NO), the processor 21A shifts to ACT42 described later.

When it is determined that the primary authentication result is authentication OK (ACT35, YES), the processor 21A updates the authentication screen displayed on the display (ACT36). The processor 21A controls the display 26 to present that the result of the primary authentication is authentication OK and display a message prompting the approaching user to execute an operation for acquiring the other information. For example, if the primary authentication is executed by the registered person ID, the processor 21A controls the display 26 to display a message prompting the approaching user to speak a keyword. In a case where the primary authentication is executed by voice, the processor 21A controls the display 26 to display a message prompting the approaching user to hold the mobile device 14 configured as an IC card over the reading range of the authentication information reading unit 30. Alternatively, the processor 21A can indicate both that the result of the primary authentication is authentication OK and the operation to be executed next by deleting one of the messages of the two operations displayed in the ACT32.

After that, the processor 21A determines whether the voice or the registered person ID which has not been acquired is acquired (ACT37). That is, the processor 21A determines whether the information that has not been used for the primary authentication in the ACT34 is acquired. If the voice or registered person ID is not acquired even after a predetermined period of time has elapsed, or if it is determined that a cancel operation as described above has been executed (ACT37, NO), the processor 21A proceeds to ACT11.

When it is determined that the voice or registered person ID has been acquired (ACT37, YES), the processor 21A executes secondary authentication based on the acquired information (ACT38). In the secondary authentication, the processor 21A searches the registered person DB 21B2 for registered person voice information or a registered person ID corresponding to the acquired voice or registered person ID.

The processor 21A determines whether the secondary authentication result indicates that the authentication is OK (ACT39). The processor 21A determines that authentication is OK if the registered person voice information or the registered person ID corresponding to the acquired voice or registered person ID is registered in the registered person DB 21B2. When it is determined that the secondary authentication result is not authentication OK, that is, authentication NG, (ACT39, NO), the processor 21A shifts to ACT42 processing to be described later.

In a case where it is determined that the secondary authentication result is also authentication OK (ACT39, YES), the processor 21A causes the image forming apparatus 11 to transition to a full function usable state (ACT40). In the full function usable state, power supply to the image reading unit 23, the conveying unit 24, and the image forming unit 25 is started, and the image reading unit 23, the conveying unit 24, and the image forming unit 25 are shifted to an operable state. In particular, by supplying power to components included in the image forming unit 25 for preheating, it is possible to execute a quick printing operation.

Then, the processor 21A controls the display 26 to display an operation selection screen (ACT41), and proceeds to ACT21.

In addition, when it is determined that the primary authentication result is authentication NG (ACT35, NO), or when it is determined that the secondary authentication result is authentication NG (ACT39, NO), the processor 21A controls the display 26 to display a new registration screen (ACT42). The new registration screen can include a message indicating that authentication by the mobile device 14 or authentication by voice has failed and a message asking whether to newly register a user.

Then, the processor 21A determines whether an instruction to execute new registration is received from the approaching user (ACT43). This determination can be made, for example, as to whether the operation interface 27 corresponding to the "execute" button arranged on the new registration screen has been operated. In a case where it is determined that there is no instruction to execute new registration even after a certain predetermined time has elapsed or a cancel operation is executed by the approaching user (ACT43, NO), the processor 21A shifts to ACT11. The cancel operation includes, for example, an explicit cancel operation by the operation interface 27 corresponding to a "return" button displayed on the new registration screen and an implicit cancel operation by which the approaching user has left the image forming apparatus 11.

When it is determined that an instruction to execute new registration has been received from the approaching user, (ACT43, YES) and the processor 21A executes new registration processing as will be described later in detail and register information of the new person in the registered person DB 21B2 (ACT44). Then, the processor 21A shifts to ACT32.

By repeating the process from ACT32 after the registration of the new registered person in this way, it is possible to execute the primary and secondary authentication again and proceed to the operation selection. That is, by displaying the operation selection screen in ACT41, the approaching user can confirm that new registration as a registered person of the image forming apparatus 11 has succeeded. Further, since the new registration screen in ACT42 is displayed, the approaching user can know that the new registration has not been correctly executed, and can try the new registration again.

Figure 8:
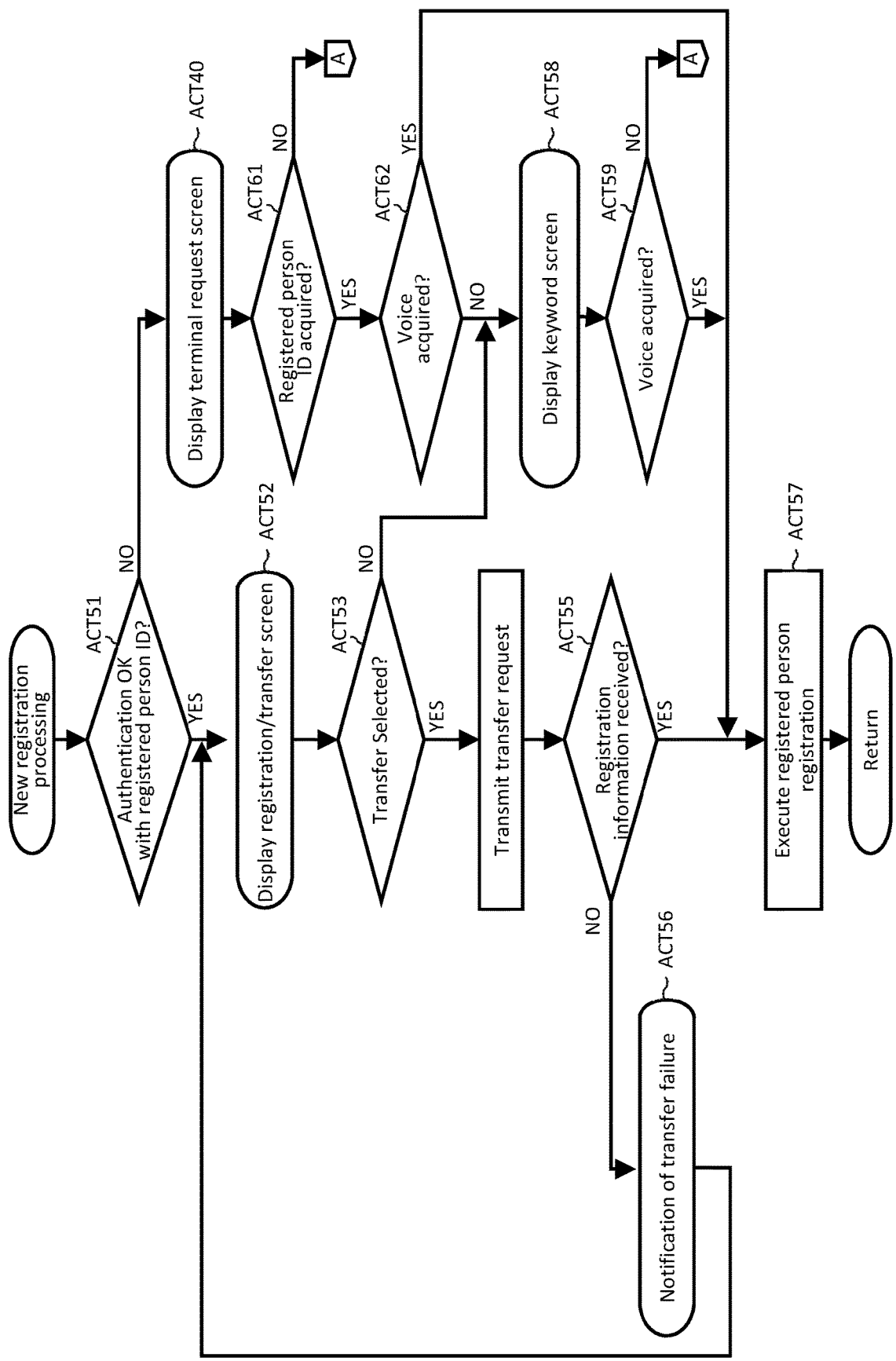
FIG. 8 is a flowchart of a new registration processing in FIG. 7.

FIG. 8 is a flowchart of the new registration process of ACT44. The new registration process is executed in four cases, that is, in a case where the primary authentication is executed with the registered person ID and the authentication is NG, in a case where the primary authentication is executed with voice and the authentication is NG, in a case where the primary authentication is executed with the registered person ID and the authentication is NG with voice of the secondary authentication.

The processor 21A first determines whether the authentication result based on the registered person ID is authentication OK (ACT51). In a case where it is determined that the authentication result based on the registered person ID is authentication NG (ACT51, NO), the processor 21A proceeds to ACT60 described later.

When it is determined that the authentication result by the registered person ID indicates that the authentication is OK (ACT51, YES), the processor 21A controls the display 26 to display a registration/transfer screen (ACT52). This registration/transfer screen prompts the approaching user to select whether to execute new registration by the image forming apparatus 11 or to execute new registration by transferring registered information to another image forming apparatus 11.

Then, the processor 21A determines whether the approaching user has selected transfer (ACT53). For example, it is determined whether the operation interface 27 corresponding to the "transfer" button arranged on the registration/transfer screen is operated. When it is determined that the approaching user has selected transfer, that is, when there is an operation of the operation interface 27 corresponding to the "transfer" button (ACT53, YES), the processor 21A proceeds to ACT54, which will be described later. When it is determined that the approaching user has not selected the transfer, that is, if it is determined that the approaching user has selected the new registration, the processor 21A proceeds to ACT58 described below. The determination that the approaching user has selected new registration can be made when the operation interface 27 corresponding to the "register" button arranged on the registration/transfer screen is operated. If neither new registration nor transfer is selected even after a predetermined period of time elapses, or if a cancel operation is executed by the approaching user, the processor 21A may proceed to ACT11. The cancel operation includes, for example, an explicit cancel operation by the approaching user operation on the operation interface 27 corresponding to the "return" button arranged on the registration/transfer screen, and an implicit cancel operation by the approaching user who has moved away from the image forming apparatus 11.

When it is determined that the approaching user has selected transfer, the processor 21A controls the first communication interface 22 to transmit a transfer request to another image forming apparatus 11 via the network 12 (ACT54). The transfer request includes the registered person ID for which authentication is OK.

After receiving the transfer request, if the registration information of the registered person corresponding to the registered person ID included in the transfer request is already registered in the registered person DB 21B2, the other image forming apparatus 11 returns the registration information.

Therefore, the processor 21A determines whether the registration information from the other image forming apparatus 11 is received by the first communication interface (ACT55). When it is determined that the registration information is not received even after the predetermined time elapses (ACT55, NO), the processor 21A controls the display 26 to display information indicating that the transfer failed (ACT56), and the process proceeds to ACT11.

When it is determined that the registration information has been received (ACT55, YES), the processor 21A executes registration (ACT57). That is, the processor 21A registers the registered person ID and the registered person voice information, which are the received registration information, in the registered person DB 21B2. Then, the processor 21A shifts to ACT32.

When it is determined that the approaching user does not select the transfer, that is, the new registration is selected (ACT53, NO), since the authentication result using the registered person ID indicates that the authentication is OK, it is required to acquire only the voice information. Therefore, the processor 21A controls the display 26 to display a keyword screen including a keyword for registration (ACT58).

The processor 21A determines whether the voice is acquired by the microphone 29 (ACT59). In a case where it is determined that the voice is not acquired even after the predetermined time elapses or the cancel operation is executed by the approaching user (ACT58, NO), the processor 21A shifts to ACT11. The cancel operation includes, for example, an explicit cancel operation by the operation interface 27 corresponding to a "return" button arranged on the keyword screen, and an implicit cancel operation by which the approaching user has left the image forming apparatus 11.

When it is determined that the voice information has been acquired (ACT59, YES), the processor 21A proceed to ACT57, and execute registration using the registered person ID for which authentication is OK and the voice acquired in ACT59.

When it is determined that the authentication result using the registered person ID is authentication NG (ACT51, NO), the processor 21A controls the display 26 to display the terminal request screen (ACT60). The terminal request screen prompts the approaching user to hold the mobile device 14 over the reading range of the authentication information reading unit 30.

Then, the processor 21A determines whether the registered person ID is acquired from the mobile device 14 by the authentication information reading unit 30 (ACT61). When it is determined that the registered person ID is not acquired even after the predetermined time elapses or the cancel operation is executed (ACT61, No), the processor 21A shifts to ACT11. The cancel operation includes, for example, an explicit cancel operation by an operation of the operation interface 27 corresponding to a "return" button arranged on the terminal request screen, and an implicit cancel operation by which the approaching user has left the image forming apparatus 11.

When it is determined that the registered person ID has been acquired (ACT61, YES), the processor 21A determine whether the authentication result by voice is authentication OK (ACT62). When it is determined that the authentication result by voice is authentication NG (ACT62, NO), the processor 21A shifts to ACT58. As a result, it is possible to further acquire the voice of the approaching user and execute registration using the registered person ID and the voice acquired together.

In addition, when it is determined that the authentication result by voice is authentication OK (ACT62, YES), the processor 21A shifts to ACT57, registration is executed by the acquired registered person ID and voice of authentication OK.

As described above, the image forming apparatus 11 to which the control device according to the present embodiment is applied includes the authentication information reading unit 30 serving as a reading unit, the microphone 29 serving as a biometric information input unit, the memory 21B, and the processor 21A. The authentication information reading unit 30 reads, for example, a registered person ID as the authentication information from the mobile device 14 such as an IC card that is a medium recording the authentication information carried by the user. The microphone 29 receives an input of a voice that is the biometric information. The memory 21B stores registered person DB 21B2 that stores registered person IDs of a plurality of registered persons and registered person voice information corresponding to the voices of the registered persons in association with each other. The processor 21A compares the registered person ID read by the authentication information reading unit 30 and the voice received by the microphone 29 with the registered person ID and the registered person voice information stored in the registered person DB 21B2 in the memory 21B to authenticate the user, and enables a specific operation permitted only to the registered person in a case where the user is authenticated as the registered person.

This makes it possible to prevent "spoofing" use of the image forming apparatus 11 by a third party who has acquired the mobile device 14, which is a medium storing the registered person ID, by executing authentication using voice, which is biometric information, in addition to authentication using the registered person ID, which is authentication information.

In addition, by using voice as biometric information, it is possible to use the inexpensive microphone 29 as a biometric information input unit that inputs biometric information, and it is possible to suppress an increase in the price of the image forming apparatus 11 that is necessary for applying the control device according to the present embodiment.

For example, when a user who intends to use the image forming apparatus 11 is authenticated as a registered person, the image forming apparatus 11 to which the control device is applied enables a printing operation based on a print job associated with the registered person ID.

This makes it possible to prevent confidential documents from being printed by a third party.

In addition, the control device in this embodiment further includes the first communication interface 22 as a communication interface that communicates with the image forming apparatus 11 to which the other control device is applied via the network 12, and if the user is not authenticated as the registered person, the processor 21A acquires the registered person ID read by the authentication information reading unit 30 or the registered person voice information stored in the memory of the other image forming apparatus 11 corresponding to the voice received by the microphone 29 from the other control device via the network 12 by the first communication interface 22 and stores the acquired registered person ID and registered person voice information in the registered person DB 21B2 in the memory 21B.

Accordingly, by acquiring the information registered in the other image forming apparatus 11, the new registration of the registered person ID and the registered person voice information can be easily executed.

If the registered person ID read by the authentication information reading unit 30 or the registered person voice information corresponding to the voice received by the microphone 29 is not stored in the memory of another image forming apparatus 11, it is possible to newly register the registered person ID and/or the voice information by using the authentication information reading unit 30 and/or the microphone 29.

Figure 9:
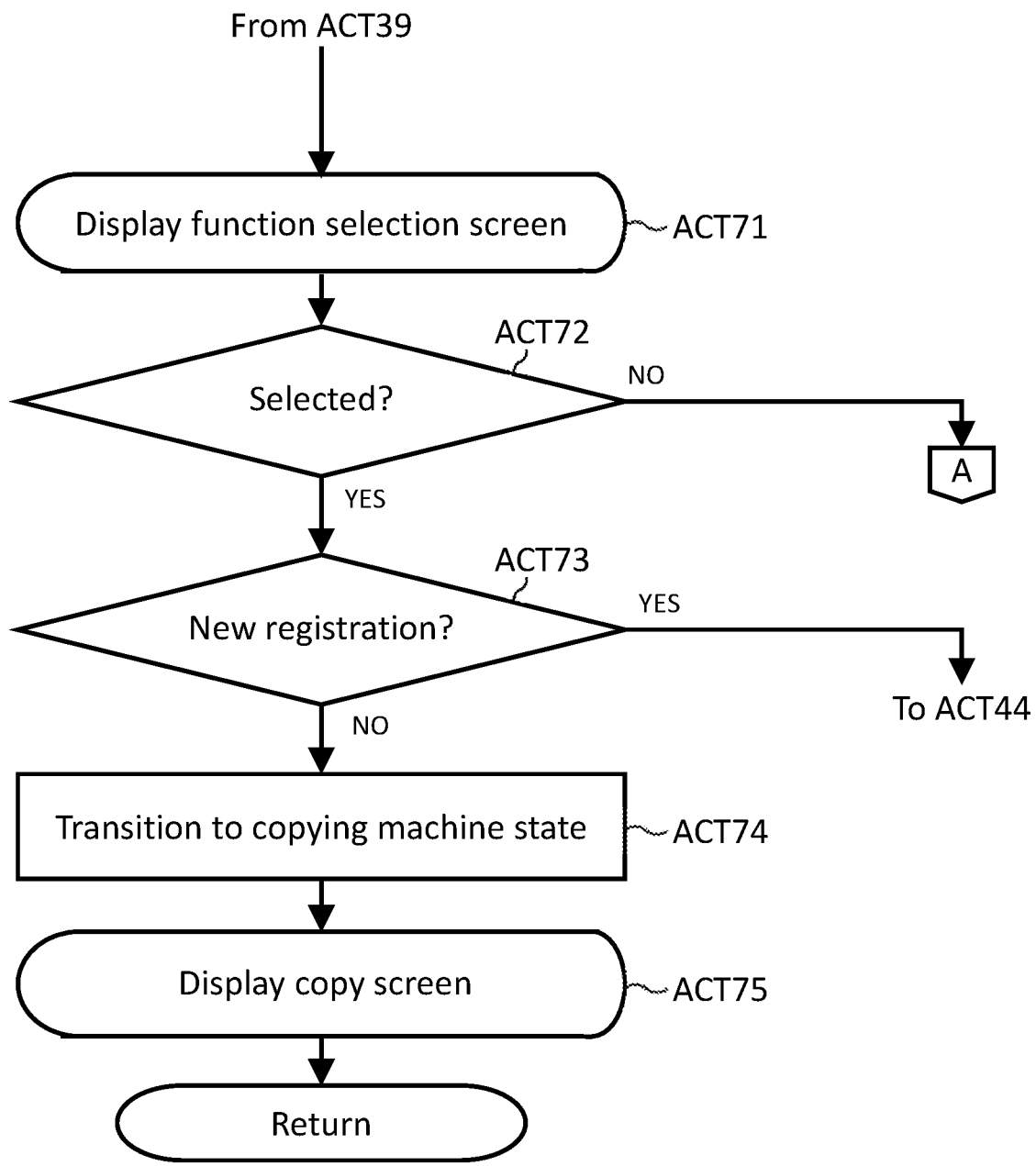
FIG. 9 is a flowchart of an authentication processing by a control device according to a second embodiment.

FIG. 9 is a flowchart of authentication processing executed by a control device according to a second embodiment. FIG. 9 illustrates only the difference from the first embodiment.

In a case where it is determined in the ACT39 that the secondary authentication result indicates authentication NG (ACT39, NO), in the present embodiment, the processor 21A controls the display 26 to display a function selection screen (ACT71). Since the secondary authentication by the mobile device 14 or the secondary authentication by voice has failed, the function selection screen can include a message prompting the user to select whether to execute a copy operation that can be used only with the primary authentication or to execute new registration. For example, a "copy" button for selecting copying and a "registration" button for selecting new registration can be arranged on the function selection screen.

If it is determined that the primary authentication result is authentication NG in the ACT35 (ACT35, NO), the processor 21A proceeds to processing for displaying a new registration screen of the ACT42, as in the first embodiment.

After the function selection screen is displayed in the ACT71, the processor 21A determines whether the approaching user has made a selection (ACT72). This determination can be made as to whether the operation interface 27 corresponding to the "copy" button or "registration" button arranged on the function selection screen has been operated, for example. When it is determined that there is no instruction to make any selection even after a predetermined period of time has elapsed or a cancel operation has been executed (ACT72, NO), the processor 21A proceeds to ACT11. The cancel operation includes, for example, an explicit cancel operation by the operation interface 27 corresponding to a "return" button arranged on the new registration screen and an implicit cancel operation by which the approaching user has left the image forming apparatus 11.

When it is determined that the approaching user has made a selection, (ACT72, YES), the processor 21A determines whether the approaching user has selected a new registration (ACT73). For example, when the operation interface 27 corresponding to the "registration" button arranged on the function selection screen is operated, it can be determined that the processor 21A selects new registration. In addition, in a case where the operation interface 27 corresponding to the "copy" button arranged on the function selection screen is operated, it can be determined that the processor 21A does not select new registration.

When it is determined that the approaching user has selected the new registration (ACT73, YES), the processor 21A proceeds to ACT44 and register the information of the new registered person in the registered person DB 21B2.

On the other hand, when it is determined that the approaching user has not selected new registration (ACT73, NO), the processor 21A causes the image forming apparatus 11 to transition to a copying machine state (ACT74). Then, the processor 21A controls the display 26 to display a copy screen (ACT75), and shifts to ACT21. Thus, the approaching user can copy a document by the image forming apparatus 11.

As described above, in the image forming apparatus 11 to which the control device according to the present embodiment is applied, when only one of the registered person ID read by the authentication information reading unit 30 and the voice received by the microphone 29 matches one of the registered person ID and the registered person voice information stored in the registered person DB21B2 of the memory 21B, the processor 21A enables some particular operations permitted to users other than the registered persons.

In this way, if the secondary authentication is authentication NG but the primary authentication is authentication OK, only a function unrelated to "spoofing" by another user, for example, a copy function, is permitted, thereby improving the convenience of use of the image forming apparatus 11.

Figure 10:
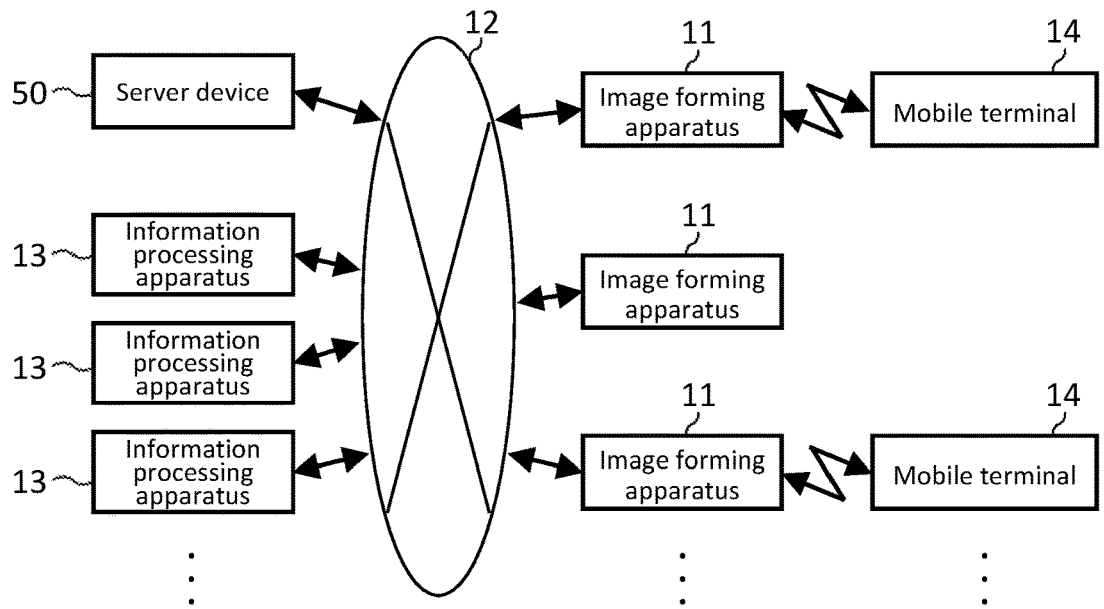
FIG. 10 is a diagram of an image forming system to which a control device according to a third embodiment is applied.

FIG. 10 is a diagram of an image forming system 1 to which a control device according to a third embodiment is applied.

In the third embodiment, at least one image forming apparatus 11 and a plurality of information processing apparatuses 13 are connected to a server device 50 via a network 12. In the third embodiment, the server device 50 and the image forming apparatus 11 collaborate to perform various functions as a control device. In a case where the image forming system 1 includes a plurality of image forming apparatuses 11, the server device 50 and each of the image forming apparatuses 11 form one control device. Therefore, the image forming system 1 includes a plurality of control devices.

In this embodiment, the registered person DB 21B2 and the print job storage 21B3 may be omitted from the memory 21B of the image forming apparatus 11.

Figure 11:
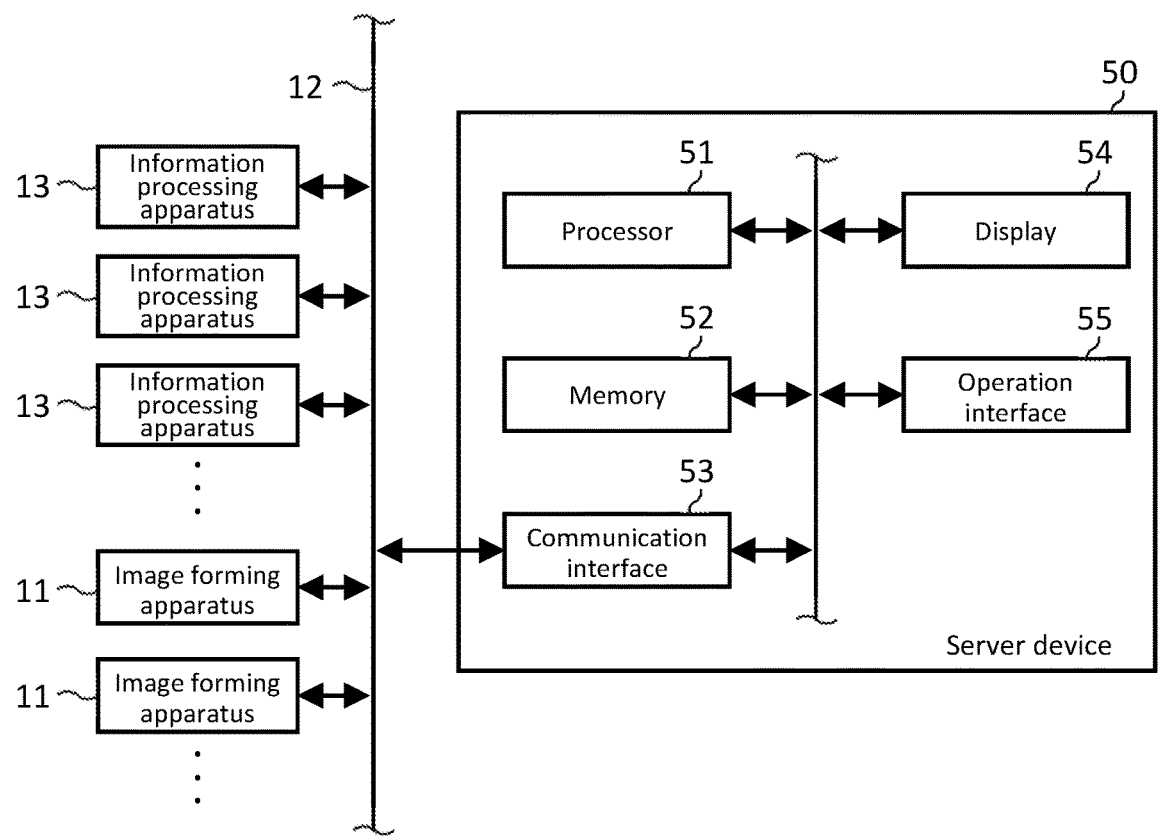
FIG. 11 is a diagram of a server device according to a third embodiment.

FIG. 11 is a diagram of the server device 50 as a part of the control device according to the third embodiment. The server device 50 includes a processor 51, a memory 52, and a communication interface 53. The server device 50 may further comprise a display 54 and an operation interface 55.

The processor 51 is an arithmetic element (for example, a CPU) that executes arithmetic processing. The memory 52 is a storage device that stores programs, data used in the programs, and the like. In addition, the memory 52 temporarily stores data being processed by the processor 51. The memory 52 includes a non-volatile memory and a volatile memory. The processor 51 executes various types of processing based on data such as the programs stored in the memory 52.

The display 54 displays a screen according to input video signals. The operation interface 55 includes various user interfaces. The operation interface 55 outputs an operation signal in response to a user operation to the processor 51.

FIG. 12 depicts data stored in the memory 52 included in the server device 50. The memory 52 includes a program storage unit 521, a registered person DB 522, a print job storage unit 523, and a temporary storage unit 524. Further, the memory 52 includes an image forming apparatus database (hereinafter referred to as the image forming apparatus DB) 525. The program storage unit 521, the registered person DB 522, the print job storage unit 523, and the image forming apparatus DB 525 are included or stored in the non-volatile memory, and the temporary storage unit 524 is included or stored in the volatile memory.

The program storage unit 521 stores one or more programs for causing the processor 51 to execute an operation for controlling the image forming apparatus 11. The program includes a control program for causing the processor 51 to execute an operation as a part of the control device according to the third embodiment.

The registered person DB 522 stores information of registered persons who use the image forming apparatus 11, similarly to the registered person DB 21B2 in the first embodiment. In the first embodiment, the registration information of the registered persons who use the image forming apparatuses 11 is stored for each image forming apparatus 11, but in the third embodiment, the registration information of the registered persons for all the image forming apparatuses 11 is collectively stored. Therefore, the record for each registered person in the registered person DB 522 are the same as the registered person DB 21B2 in the first embodiment.

Similar to the print job storage 21B3 in the first embodiment, the print job storage 523 stores print jobs transferred by the information processing apparatus 13 via the network 12. That is, the information processing apparatus 13 generates a print job for printing, and transmits the generated print job to the server device 50. When receiving such an executable print job, the processor 51 of the server device 50 stores the received print job in the print job storage unit 523. When one of the image forming apparatuses 11 executes printing based on the print job, the processor 51 transmits the print job to the image forming apparatus 11 via the network 12 and deletes the print job from the print job storage unit 523.

The temporary storage unit 524 temporarily stores data being processed by the processor 51.

The image forming apparatus DB 525 stores information for authentication transmitted from the image forming apparatuses 11 via the network 12. FIG. 13 depicts a data structure of a record for each image forming apparatus 11 in the image forming apparatus DB 525. The record includes the image forming apparatus ID, the registered person ID, and the registered person voice information.

The image forming apparatus ID is identification information for uniquely identifying each image forming apparatus 11. For example, the image forming apparatus ID is registered when an image forming apparatus 11 is newly added to the image forming system 1. The registered person ID is a registered person ID acquired by the image forming apparatus 11 and transmitted via the network 12 when executing the registered person authentication. Similarly, the registered person voice information is a voice that the image forming apparatus 11 acquires and transfers via the network 12 in executing the registered person authentication.

Figure 14:
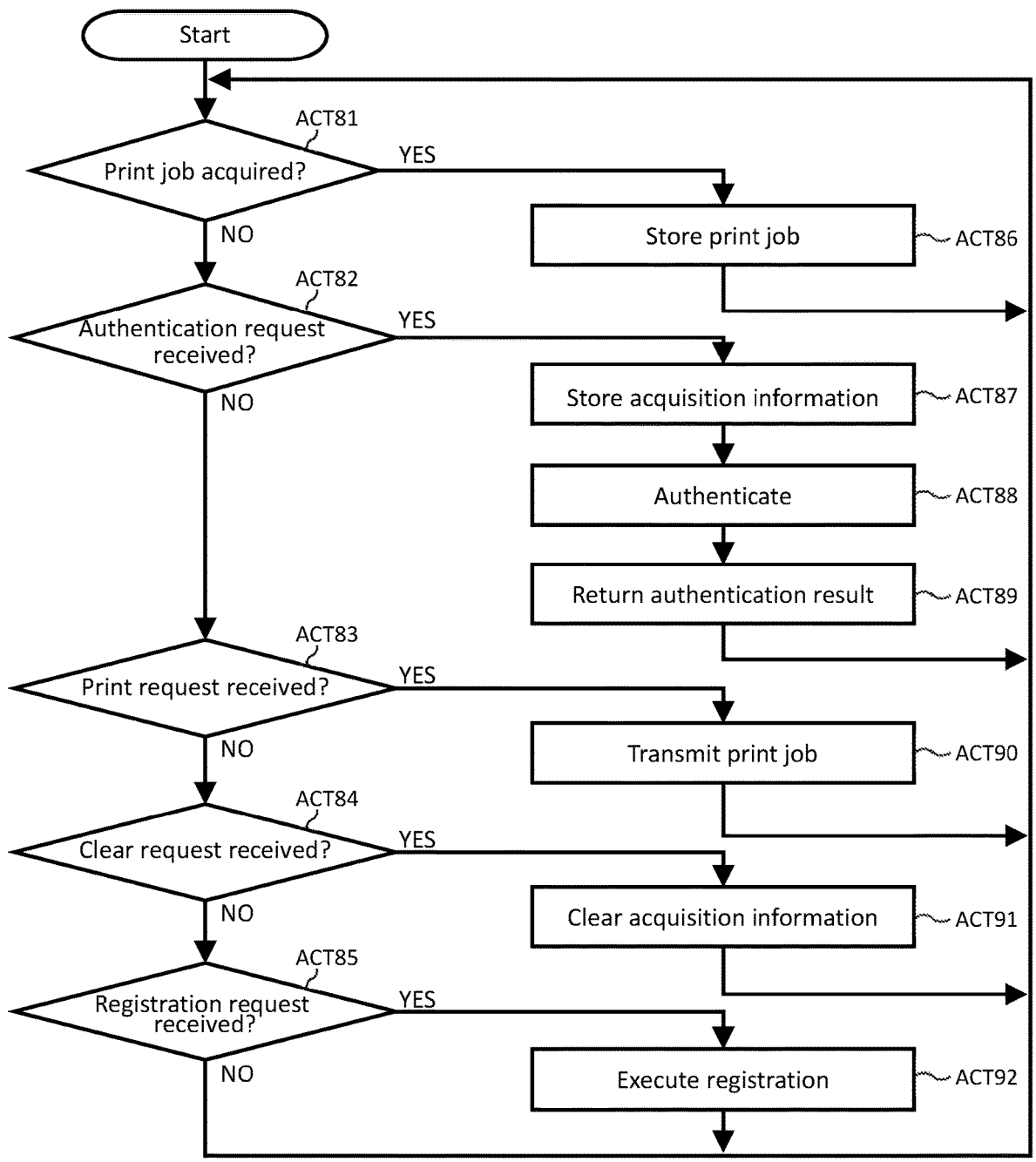
FIG. 14 is a flowchart of an operation of a server device according to a third embodiment.

FIG. 14 is a flowchart of an operation of the server device 50. When the power of the server device 50 is turned on and the processor 51 of the server device 50 is activated, the processor 51 executes the operation illustrated in the flowchart in accordance with the program stored in the program storage unit 521.

The processor 51 of the server device 50 first determines whether a print job has been received from any of the information processing apparatuses 13 via the communication interface 53 (ACT81). When it is determined that a print job has not been received (ACT81, No), the processor 51 determines whether an authentication request has been received from any of the image forming apparatuses 11 via the communication interface 53 (ACT82). When it is determined that an authentication request has not been received (ACT82, No), the processor 51 determines whether a print request has been received from any of the image forming apparatuses 11 via the communication interface 53 (ACT83). When it is determined that a print request has not been received (ACT83, No), the processor 51 determines whether a clear request has been received from any of the image forming apparatuses 11 via the communication interface 53 (ACT84). When it is determined that the clear request has not been received (ACT84, NO), the processor 51 determines whether a registration request has been received from any of the information processing apparatuses 13 or any of the image forming apparatuses 11 (ACT85). When it is determined that the registration request has not been received (ACT85, NO), the processor 51 proceeds to ACT81. In this manner, the processor 51 waits for any event to occur. The processing of ACT82, ACT84 and ACT85 is an operation as a part of the control device according to this embodiment.

In a case where the processor 51 determines that a print job has been received (ACT81, YES), the processor 51 stores the received print job in the print job storage unit 523 of the memory 52 (ACT86). Then, the processor 51 shifts to ACT81.

If the processor 51 determines that the authentication request is received (ACT82, YES), the processor 51 executes the following processing as a part of the control device according to the present embodiment. First, the processor 51 stores the acquisition information in the image forming apparatus DB 525 (ACT87). The authentication request includes an image forming apparatus ID for specifying the image forming apparatus 11 which is a transmission source of the authentication request, and a registered person ID or a voice which is acquisition information acquired by the image forming apparatus 11. Therefore, the processor 51 stores the registered person ID or the voice in the record of the image forming apparatus DB 525 corresponding to the image forming apparatus ID.

Thereafter, the processor 51 executes authentication by the registered person ID or voice stored in the image forming apparatus DB 525 (ACT88). In this authentication, for example, in a case where a registered person ID is stored in the image forming apparatus DB 525, the processor 51 determines whether a registered person ID corresponding to the stored registered person ID is registered in the registered person DB 522. When the voice is stored in the image forming apparatus DB 525, the processor 51 determines whether registered person voice information corresponding to the stored voice is registered in the registered person DB 522. That is, if only one of the registered person ID and the voice is stored in the image forming apparatus DB 525, the processor 51 executes primary authentication based on the stored information. If both the registered person ID and the voice are stored in the image forming apparatus DB 525, the processor 51 executes secondary authentication based on the stored information.

Then, the processor 51 causes the communication interface 53 to return the authentication result of the primary or secondary authentication to the image forming apparatus 11 that is the transmission source of the authentication request (ACT89). Thereafter, the processor 51 proceeds to ACT81.

If the processor 51 determines that a print request has been received (ACT83, YES), the processor 51 controls the communication interface 53 to transmit a print job to the image forming apparatus 11 that has sent the print request (ACT90). The print request includes an image forming apparatus ID that specifies the image forming apparatus 11 that is the transmission source of the print request. Therefore, the processor 51 acquires the registered person ID from the record of the image forming apparatus DB 525 corresponding to the image forming apparatus ID. Based on the registered person ID, the processor 51 can identify the print job to be transmitted to the image forming apparatus 11 as a request source from among the print jobs stored in the print job storage unit 523. Then, the processor 51 controls the communication interface 53 to transmit the specified print job to the image forming apparatus 11 that is the request source. Thereafter, the processor 51 proceeds to ACT81.

When it is determined that the clear request is received (ACT84, YES), the processor 51 operates as a part of the control device according to this embodiment to clear the acquisition information from the image forming apparatus DB 525 (ACT91). That is, the clear request includes the image forming apparatus ID that specifies the image forming apparatus 11 as the transmission source of the clear request. Therefore, the processor 51 specifies the record of the image forming apparatus DB 525 by the image forming apparatus ID and clears the acquired information stored therein. The acquisition information is the registered person ID and/or voice saved in the ACT87. Thereafter, the processor 51 proceeds to ACT81.

When it is determined that the registration request has been received (ACT85, YES), the processor 51 operates as a part of the control device according to the present embodiment and executes registration (ACT92). That is, the registration request includes the registered person ID and the registered person voice information which are registration information. Accordingly, the processor 51 registers the registration information in the registered person DB 522. Thereafter, the processor 51 proceeds to ACT81.

Figure 15:
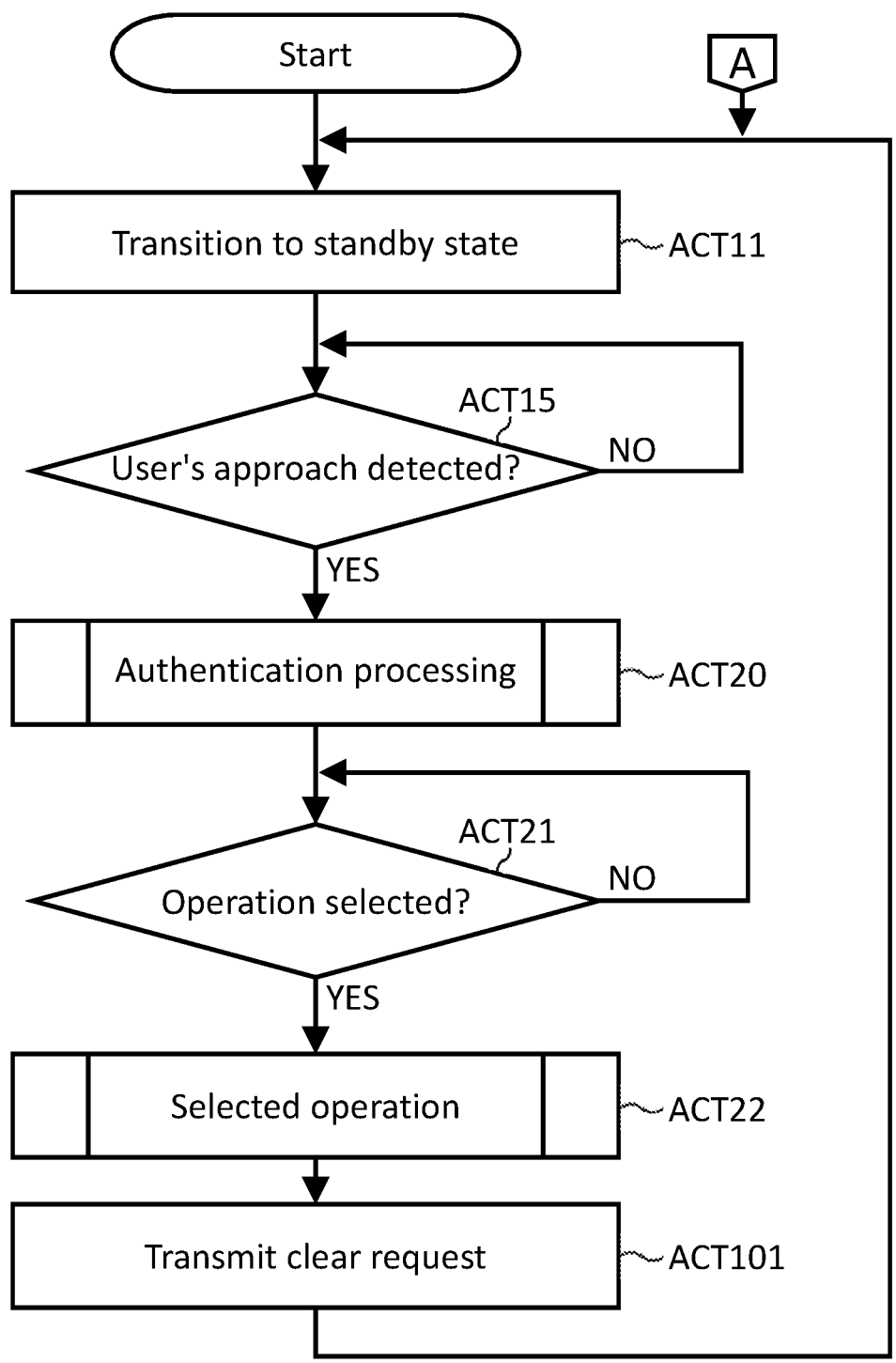
FIG. 15 is a flowchart of an operation of an image forming apparatus according to a third embodiment.

FIG. 15 is a flowchart of an operation of the image forming apparatus 11. When the power of the image forming apparatus 11 is turned on and the processor 21A of the image forming apparatus 11 is activated, the processor 21A executes the operation shown in this flowchart according to the program stored in the program storage unit 21B1.

First, the processor 21A of the image forming apparatus 11 causes the image forming apparatus 11 to transition to a standby state (ACT11). In the standby state, for example, the human sensor 28 is operable.

Thereafter, the processor 21A determines whether the approach of a user is detected (ACT15). When it is determined that the approach of a user has not been detected, (ACT15, NO), the processor 21A repeats ACT15. In this way, the processor 21A waits for a user to approach.

When it is determined that a user is approaching (ACT15, YES), the processor 21A operates as a part of the control device in this embodiment and executes authentication processing (ACT20). Details of the authentication processing in the present embodiment will be described later.

Subsequently, the processor 21A determines which operation is selected by the authenticated registered person using the operation interface 27 (ACT21). When it is determined that the registered person has not selected any operation, (ACT21, NO), the processor 21A repeats ACT21. The processor 21A thus waits for the registered person to select an operation. In a case where the registered person does not select any operation even after the predetermined time elapses, the processor 21A may shift to ACT11. Further, the processor 21A also shifts to ACT11 in a case where a cancel operation is executed by the registered person.

In a case where it is determined that the registered person selects an operation (ACT21, YES), the processor 21A executes the operation corresponding to the selection of the registered person (ACT22). For example, in a case where the print operation is selected, the processor 21A controls the first communication interface 22 to transmit a print request to the server device 50. The server device 50 returns the print job of the corresponding registered person to the image forming apparatus 11 in response to the print request by the processing of ACT83 and ACT90. Therefore, the processor 21A can execute printing based on the print job received by the first communication interface 22.

Then, the processor 21A controls the first communication interface 22 to transmit a clear request to the server device 50 (ACT101). Thereafter, the processor 21A shifts to ACT11.

Figure 16:
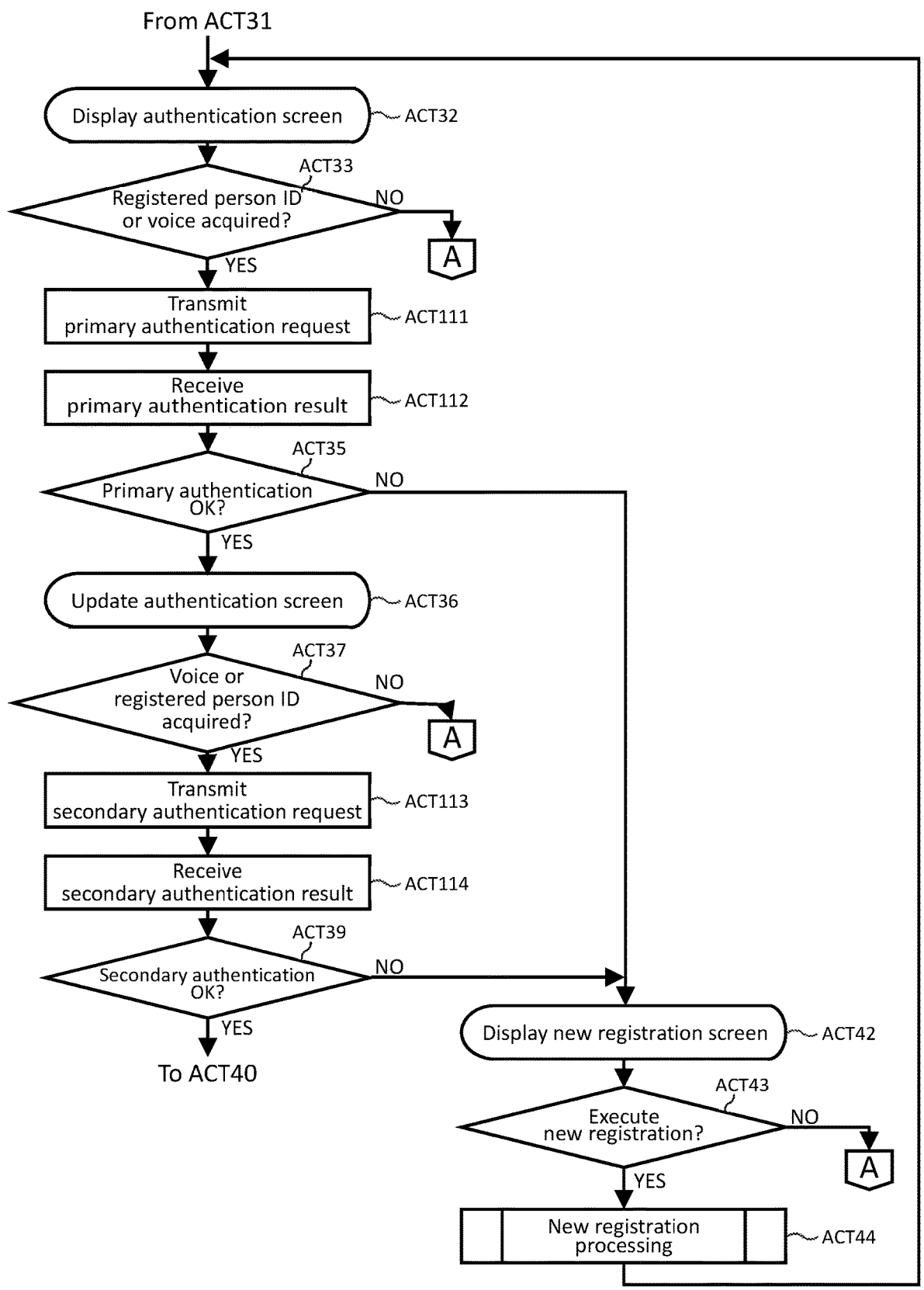
FIG. 16 is a flowchart of an operation of a control device according to a third embodiment.

FIG. 16 is a flowchart of the authentication processing of the above ACT20. FIG. 16 illustrates only the difference from the first embodiment.

As described above, the processor 21A controls the display 26 to display the authentication screen (ACT32), and then determines whether a registered person ID or a voice is acquired (ACT33). When it is determined that a registered person ID or a voice is acquired, the processor 21A controls the communication interface 53 to transmit an authentication request to the server device 50 (ACT111) in this embodiment.

The server device 50 returns the authentication result of the primary authentication corresponding to the authentication request to the image forming apparatus 11 by the processing of ACT82 and ACT87 to ACT89. Accordingly, the primary authentication result is received by the first communication interface 22 (ACT112).

The processor 21A determines whether the primary authentication result is authentication OK (ACT35). When it is determined that the primary authentication result is authentication OK (ACT35, YES), the processor 21A updates the authentication screen displayed on the display 26 as described above (ACT36) and thereafter the processor 21A determines whether a voice or a registered person ID which has not acquired is acquired (ACT37). Then, when it is determined that a voice or a registered person ID has been acquired, the processor 21A in this embodiment controls the communication interface 53 to transmit an authentication request to the server device 50 (ACT113).

The server device 50 returns the authentication result of the secondary authentication corresponding to the authentication request to the image forming apparatus 11 by the processing of the ACT82 and the ACT87 to ACT89. Accordingly, the secondary authentication result is received by the first communication interface 22 (ACT114).

Then, the processor 21A determines whether the secondary authentication result is authentication OK (ACT39), and when it is determined that the secondary authentication result is authentication OK (ACT39, YES), the processor proceeds to ACT40 as described above.

Further, in a case where it is determined that the primary authentication result indicates authentication NG (ACT35, NO) or in a case where it is determined that the secondary authentication result indicates authentication NG (ACT39, NO), the processor 21A controls the display 26 to display a new registration screen as described above (ACT42). Then, as described above, the processor 21A determines whether an instruction to execute new registration has been received from the approaching user (ACT43).

In a case where it is determined that an instruction to execute new registration is received from the approaching user (ACT43, YES), the processor 21A executes new registration processing (ACT44), which will be described in detail below. Then, the processor 21A shifts to ACT32.

Figure 17:
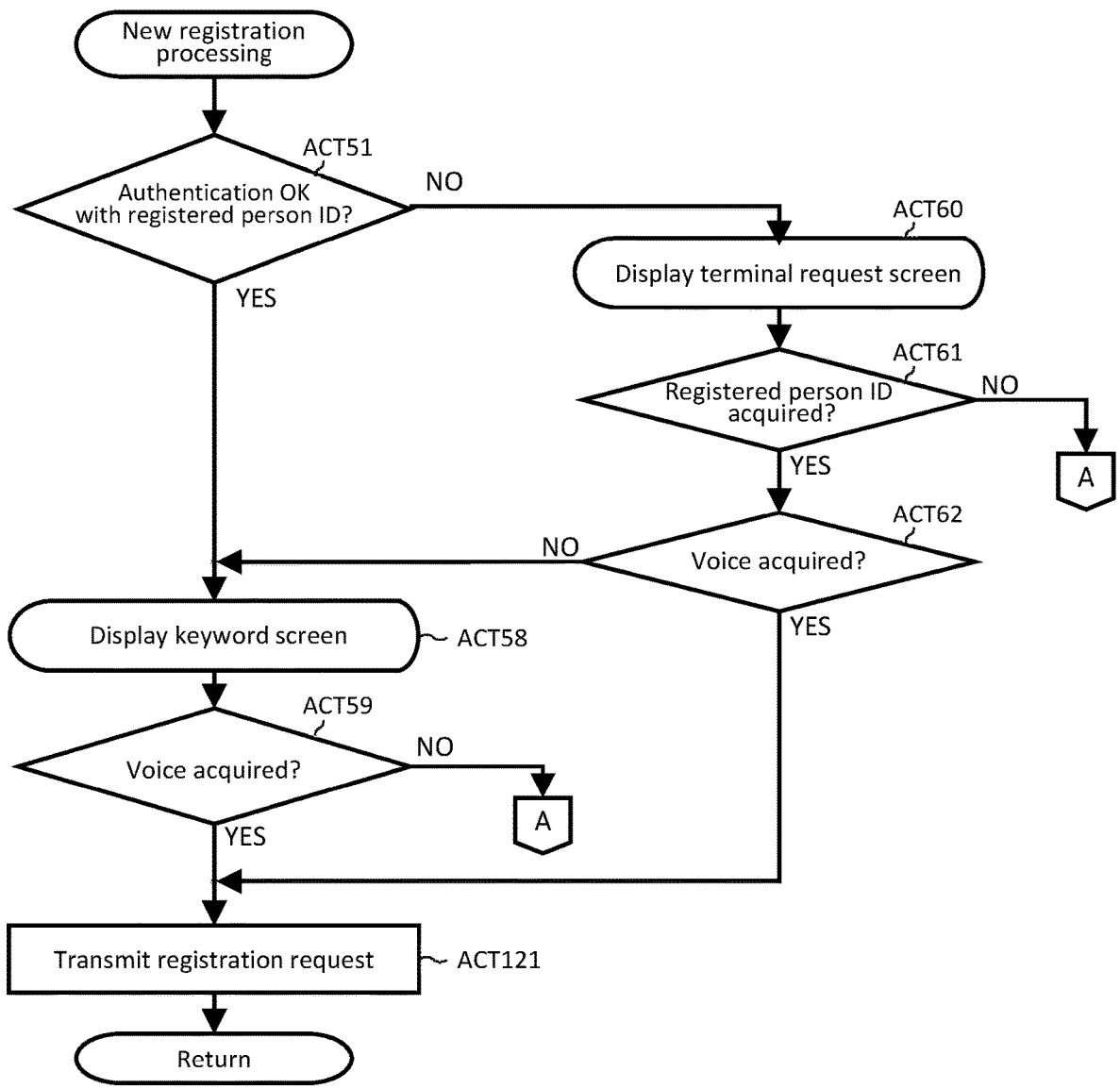
FIG. 17 is a flowchart of a new registration processing in FIG. 16.

FIG. 17 is a flowchart of the new registration processing of ACT44.

First, as described above in the first embodiment, the processor 21A determines whether the authentication result using a registered person ID indicates that the authentication is OK (ACT51). When it is determined that the authentication result by the registered person ID indicates that the authentication is OK (ACT51, YES), in this embodiment, the processor 21A controls the display 26 to display a keyword screen including a keyword for registration (ACT58). The processor 21A determines whether a voice is acquired by the microphone 29 (ACT59).

When it is determined that a voice has been acquired, (ACT59, YES), the processor 21A controls the first communication interface 22 to transmit a registration request to the server device 50 in the present embodiment (ACT121). The registration request includes the registered person ID for which authentication is OK and the voice acquired in ACT59. The server device 50 executes registration in response to the registration request by the processing of ACT85 and ACT92. Thereafter, the processor 21A shifts to ACT32.

Further, when it is determined that the authentication result by the registered person ID is authentication NG (ACT51, NO), the processor 21A controls the display 26 to display the terminal request screen as described above (ACT60). Then, the processor 21A determines whether a registered person ID is acquired from the mobile device 14 by the authentication information reading unit 30 (ACT61). When it is determined that a registered person ID has been acquired (ACT61, YES), the processor 21A determines whether the authentication result by voice is authentication OK (ACT62). When it is determined that the authentication result by voice is authentication NG (ACT62, NO), the processor 21A shifts to ACT58. When it is determined that the authentication result by voice indicates that the authentication is OK, (ACT62, YES), the processor 21A proceeds to ACT121, and controls the first communication interface 22 to transmit a registration request including the acquired registered person ID and the voice indicating that the authentication is OK to the server device 50.

As described above, the functions of the control device according to the present embodiment is performed by the image forming apparatus 11 and the server device 50 which are connected to each other via the network 12, and the authentication information reading unit 30 and the microphone 29 are arranged in the image forming apparatus 11, and the memory 21B and the processor 21A are arranged in the server device 50.

As a result, a plurality of control devices can be configured in a distributed manner by a plurality of image forming apparatuses 11 and one server device 50.

It should be noted that such a distributed configuration is suitable a control system in which a simple input device is disposed at each of multiple entrance gates and the server device 50 executes the authentication operation and the gate opening control. That is, it is possible that the authentication information reading unit 30 and the microphone 29 are disposed in the input device, the server device 50 executes authentication using two types of authentication information including the registered person ID and the registered person voice information, and controls opening of the entrance/exit gate corresponding to the input device based on the authentication result.

As a result, it is possible to prevent "spoofing" by a third party who has acquired the mobile device 14 that records a registered person ID from passing through the entrance and exit gate.

Also, in this embodiment, as in the second embodiment, if the secondary authentication is authentication NG but the primary authentication is authentication OK, only a function unrelated to "spoofing" by another user may be permitted.

In the first to third embodiments, authentication by a registered person ID and authentication by voice are combined. Authentication using biometric information other than voice may be used. The biometric information used for authentication includes static information such as a face, a fingerprint, a palm shape, a retina, and an iris, and dynamic information such as handwriting.

The image forming apparatus 11 may include a sensor for acquiring such biometric information instead of the microphone 29 for acquiring a voice.

In addition, in case of using the fingerprint or the palm shape, it is possible to use the existing components of the image forming apparatus 11 without adding a dedicated sensor newly.

Figure 18:
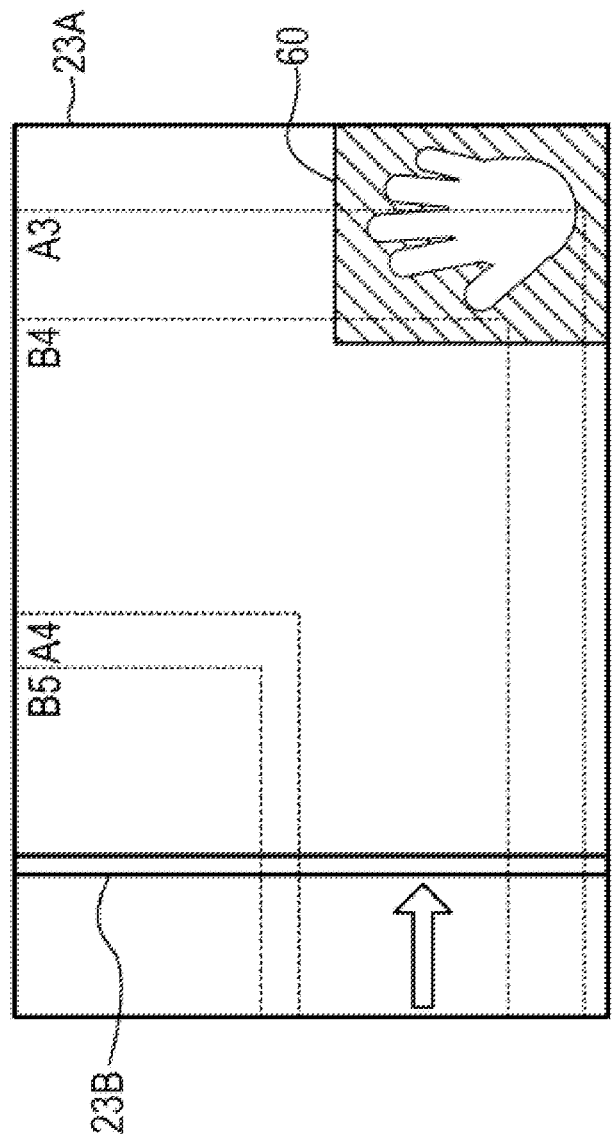
FIG. 18 is a diagram of a biometric information acquisition region on a document placement glass plate of an image forming apparatus to which a control device according to a fourth embodiment is applied.

An example of authentication using the palm shape will be described. FIG. 18 is a diagram of a biometric information acquisition region 60 in a document placement glass plate 23A of the image forming apparatus 11 to which the control device according to the fourth embodiment is applied.

As described above, the image forming apparatus 11 includes the image reading unit 23 that reads an image from a document. The image reading unit 23 includes the document placement glass plate 23A and a scanner 23B. The document placement glass plate 23A has a size larger than, for example, an A3 size document. The scanner 23B reads a document placed on the document placement glass plate 23A. The scanner 23B is, for example, a line scanner. For example, the image reading unit 23 acquires the image of the entire document by moving the scanner 23B along the document placement glass plate 23A. The processor 21A controls the movement range of the scanner 23B and the reading range of the scanner 23B according to the size of the document.

The image forming apparatus 11 can read a palm shape using the scanner 23B. The biometric information acquisition region 60, which is a region in which the palm shape is read, may be located anywhere on the document placement glass plate 23A. However, when the palm is brought into contact with the document placement glass plate 23A, the document placement glass plate 23A becomes dirty and the reading of the document is affected. Therefore, a portion having a low probability of being used for reading documents is set as the biometric information acquisition region 60. For example, as illustrated in FIG. 18, in a case where the document is arranged with the upper left of the document placement glass plate 23A as a reference and the scanner 23B is moved from the left end to the right end of the document placement glass plate 23A as indicated by an arrow in FIG. 18 to read the document, the biometric information acquisition region 60 is the lower right of the document placement glass plate 23A.

Figure 19:
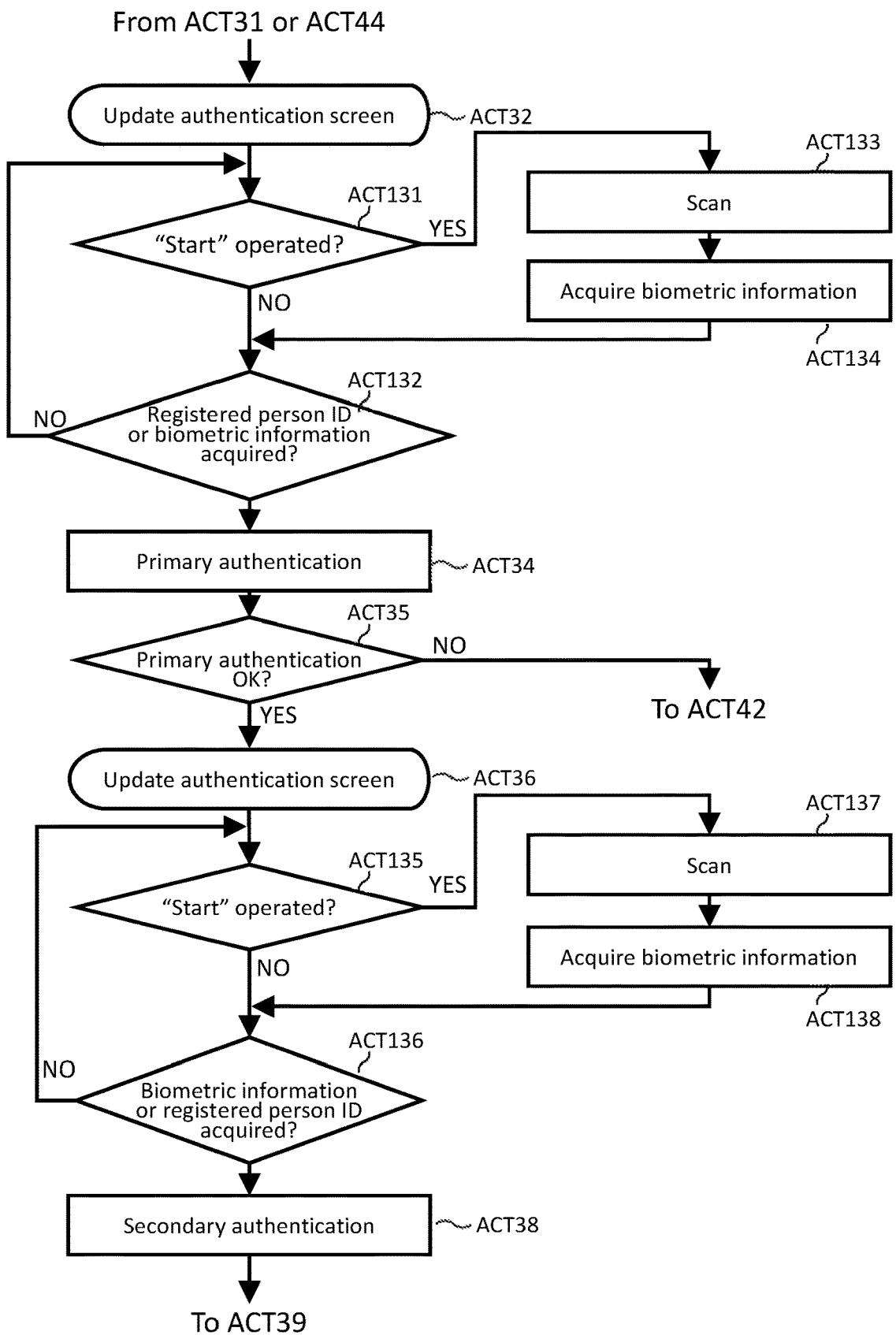
FIG. 19 is a flowchart of an authentication processing by a control device according to a fourth embodiment.

FIG. 19 is a flowchart of an authentication processing executed by the control device according to the present embodiment. FIG. 19 illustrates only the difference from the first embodiment.

The processor 21A controls the display 26 to display the authentication screen (ACT32). In the present embodiment, the authentication screen can include a message prompting an approaching user to hold the mobile device 14 configured as an IC card over the reading range of the authentication information reading unit 30 and to operate a "start" button disposed on the authentication screen or provided on the operation interface 27 with the palm of the hand placed on the lower right side of the document placement glass plate 23A serving as the biometric information acquisition region 60.

Thereafter, the processor 21A determines whether the "start" button of the operation interface 27 is operated (ACT131). When it is determined that the "start" button is not operated, the processor 21A determines whether a registered person ID or biometric information is acquired (ACT132). In a case where it is determined that a registered person ID or biometric information has not been acquired (ACT132, NO), the processor 21A proceeds to ACT131. If a registered person ID or biometric information is not acquired even after a predetermined period of time elapses or if the cancel operation is executed, the processor 21A proceeds to ACT11. Examples of the cancel operation include an explicit cancel operation in which the operation interface 27 corresponding to the "return" button arranged on the authentication screen is operated and an implicit cancel operation in which the approaching user has moved away from the image forming apparatus 11.

When it is determined that the "start" button has been operated (ACT131, YES), the processor 21A controls the scanner 23B to scan the biometric information acquisition region 60 (ACT133). In this scanning process, it is desirable that the processor 21A controls the scanner 23B to move to the biometric information acquisition region 60 and then controls the light source for reading to emit light to read an image. Accordingly, power saving of the image forming apparatus 11 can be achieved, and light from the light source can be prevented from unnecessarily entering the eyes of the approaching user. Further, when the scanner 23B is moved to the biometric information acquisition region 60, the processor 21A may control to move the scanner 23B at a speed higher than the moving speed at the time of reading, so that the scan processing of ACT133 can be completed in a short time. The processor 21A acquires a palm shape as biometric information from the image read by the scanner 23B (ACT134). Thereafter, the processor 21A shifts to ACT132.

When it is determined that a registered person ID or biometric information has been acquired (ACT132, YES), the processor 21A executes primary authentication based on the acquired information (ACT34). In the primary authentication, for example, when a registered person ID is acquired, the processor 21A searches the registered person DB 21B2 to determine whether the acquired registered person ID is registered. In addition, in a case where biometric information is acquired, the processor 21A determines whether the biometric information corresponding to the acquired palm shape is registered in the registered person DB 21B2.

The processor 21A determines whether the primary authentication result is authentication OK (ACT35). When the registered person ID or the biometric information is registered in the registered person DB 21B2, the processor 21A determines that the authentication is OK.

When it is determined that the primary authentication result is authentication OK (ACT35, YES), the processor 21A updates the authentication screen displayed on the display 26 (ACT36). That is, the processor 21A controls the display 26 to present that the result of the primary authentication is authentication OK, and display a message prompting the approaching user to execute an operation for acquiring the other information. For example, in a case where the primary authentication is executed using the registered person ID, the processor 21A displays a message that prompts the approaching user to operate the "start" button after placing the palm of the hand on the lower right side of the document placement glass plate 23A, which is the biometric information acquisition region 60. In a case where the primary authentication is executed by the biometric information, the processor 21A controls the display 26 to display a message prompting the approaching user to hold the mobile device 14 configured as an IC card over the reading range of the authentication information reading unit 30. Alternatively, the processor 21A may indicate both the successful result of the primary authentication and the operation to be executed next by deleting one of the messages of the two operations displayed in the ACT32.

Thereafter, the processor 21A determines whether the "start" button of the operation interface 27 is operated (ACT135). When it is determined that the "start" button has not been operated, (ACT135, NO), the processor 21A determines whether biometric information or a registered person ID, which was not acquired at ACT132, has been acquired (ACT136). When it is determined that the biometric information or the registered person ID has not been acquired (ACT136, NO), the processor 21A proceeds to ACT135. When the biometric information or the registered person ID is not acquired after a predetermined period of time elapses or a cancel operation is executed, the processor 21A proceeds to ACT11.

When it is determined that the "start" button has been operated (ACT135, YES), the processor 21A scans the biometric information acquisition region 60 with the scanner 23B (ACT137). The processor 21A acquires a palm shape as biometric information from an image read by the scanner 23B (ACT138). Thereafter, the processor 21A shifts to ACT136.

When it is determined that the biometric information or the registered person ID is acquired (ACT136, YES), the processor 21A executes secondary authentication based on the acquired information (ACT38). In the secondary authentication, the processor 21A determines whether the acquired biometric information or the acquired registered person ID is registered in the registered person DB 21B2. Then, the processor 21A shifts to ACT39 and determines whether the secondary authentication result is authentication OK.

As described above, the image forming apparatus 11 to which the control device according to the present embodiment is applied can use biometric information other than voice.

In particular, since the image forming apparatus 11, which is an MFP, has the scanner 23B for reading an image and can use the scanner periphery for reading a palm shape or a fingerprint, it is possible to suppress an increase in the price of the image forming apparatus 11 having the control device according to the present embodiment.

Although it has been described in the aforementioned exemplary embodiments that the mobile device 14 is an IC card, the present invention is not limited to this configuration. As described above, the mobile device 14 may be configured as a smartphone, a tablet PC, a wireless communication tag, or the like capable of wirelessly communicating with the second communication interface 31 of the image forming apparatus 11 by a wireless communication method such as Wi-Fi®, Wi-Fi Direct® or Bluetooth Low Energy®.

In such a case, for example, the second communication interface 31 is configured to acquire a "registered person ID" from the mobile device 14 that enters the communication range. If the "registered person ID" can be acquired from the mobile device 14 by the second communication interface 31, the processor 21A can determine that a user who may be a registered person is present near the image forming apparatus 11. That is, the human sensor 28, the authentication information reading unit 30, and the like can be omitted.

Further, the functions described in each of the above-described embodiments may be performed by not only hardware but software executed by a computer according to one or more programs. In addition, each function may be selectively performed by either software or hardware.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
    a memory that stores identification information of authorized users in association with biometric information;
    a reading device configured to read identification information from a medium;
    an input device through which biometric information is input;
    a network interface configured to communicate with another image forming apparatus; and
    a processor configured to:
        upon receipt of one of identification information and biometric information, perform a first authentication process by determining whether the received one of identification information and biometric information is stored in the memory, wherein the first authentication process succeeds when the received one of identification information and biometric information is stored in the memory,
        when the first authentication process has succeeded, perform a second authentication process upon receipt of the other of identification information and biometric information by determining whether the other of identification information and biometric information is stored in the memory in association with the received one of identification information and biometric information, wherein the second authentication process succeeds when the other of identification information and biometric information is stored in the memory in association with the received one of identification information and biometric information,
        when the second authentication process has succeeded, enable a first operation that can be performed for the corresponding authorized user, and
        when the first authentication process has succeeded upon receipt of the identification information and the second authentication process has failed upon receipt of the biometric information,
            check whether the biometric information is stored in the other image forming apparatus in association with the received identification information, and
            when the biometric information is stored in the other image forming apparatus in association with the received identification information, acquire and store in the memory the biometric information in association with the identification information such that the first operation is enabled for a user having the identification information.

2. The image forming apparatus according to claim 1, wherein the processor is further configured to enable a second operation that can be performed for non-authorized users when the first authentication process has succeeded but the second authentication process has failed.

3. The image forming apparatus according to claim 1, wherein the first operation is a print operation based on a print job issued by the corresponding authorized user.

4. The image forming apparatus according to claim 1, further comprising:
    a display, wherein
    the processor is further configured to, when one of the identification information and the biometric information is not stored in the memory, generate a registration screen for the display through which the one of the identification information and the biometric information can be registered.

5. The image forming apparatus according to claim 1, wherein
    the input device is a microphone, and
    the biometric information is voice data.

6. The image forming apparatus according to claim 5, further comprising:
    a display, wherein
    the processor is further configured to, before performing either the first authentication process or the second authentication process, generate an authentication screen for the display, prompting a user to utter a particular keyword.

7. The image forming apparatus according to claim 1, wherein
    the input device is a scanner, and
    the biometric information is an image of a palm.

8. The image forming apparatus according to claim 7, further comprising
    a display, wherein
    the processor is further configured to, before performing either the first authentication process or the second authentication process, generate an authentication screen for the display, prompting a user to place a palm on a reading surface of the scanner.

9. An image forming system, comprising:
a server including:
a first memory that stores identification information of authorized users in association with biometric information thereof; and
one or more image forming apparatuses each including:
a second memory,
a reading device configured to read identification information from a medium,
an input device through which biometric information is input,
a network interface configured to communicate with the server, and
a processor configured to:
upon receipt of one of identification information and biometric information, perform a first authentication process by determining whether the received one of identification information and biometric information is stored in the first memory, wherein the first authentication process succeeds when the received one of identification information and biometric information is stored in the first memory,
when the first authentication process has succeeded, perform a second authentication process upon receipt of the other one of identification information and biometric information by checking whether the other one of identification information and biometric information is stored in the first memory in association with the received one of identification information and biometric information, wherein the second authentication process succeeds when the other of identification information and biometric information is stored in the first memory in association with the received one of identification information and biometric information,
when the second authentication process has succeeded, enable a first operation that can be performed for the corresponding authorized user, and
when the first authentication process has succeeded upon receipt of the identification information and the second authentication process has failed upon receipt of the biometric information,
check whether the biometric information is stored in the first memory in association with the received identification information, and
when the biometric information is stored in the first memory in association with the received identification information, acquire and store in the second memory the biometric information in association with the identification information such that the first operation is enabled for a user having the identification information.

10. The image forming system according to claim 9, wherein the processor is further configured to enable a second operation when the first authentication process has succeeded but the second authentication process has failed, the second operation being an operation that can be performed for non-authorized users.

11. The image forming system according to claim 9, wherein the first operation is a print operation based on a print job issued by the corresponding authorized user.

12. The image forming system according to claim 9, wherein each of the image forming apparatuses further includes a display, and
the processor is further configured to, when one of the identification information and the biometric information is not stored in the memory, generate a registration screen for the display by which the one of the identification information and the biometric information can be registered.

13. The image forming system according to claim 9, wherein
the input device is a microphone, and
the biometric information is voice data.

14. The image forming system according to claim 13, wherein
each of the image forming apparatuses further includes a display, and
the processor is further configured to, before performing either the first authentication process or the second authentication process, generate an authentication screen for the display, the authentication screen prompting a user to utter a particular keyword.

15. The image forming system according to claim 9, wherein
the input device is a scanner, and
the biometric information is an image of a palm.

16. The image forming system according to claim 15, wherein
each of the image forming apparatuses further includes a display, and
the processor is further configured to, before performing either the first authentication process or the second authentication process, generate an authentication screen for the display, the authentication screen prompting a user to place a palm on a reading surface of the scanner.

17. The image forming system according to claim 9, wherein
each of the image forming apparatuses further includes a display and a sensor configured to detect an approaching user, and
the processor is further configured to, upon detection of an approaching user by the sensor, generate an authentication screen for the display, the authentication screen prompting a user to input identification information via the reading device or biometric information via the input device.

18. A method carried out by an image forming system, the method comprising:
storing, in a memory, identification information of authorized users in association with biometric information thereof;
upon receipt of one of identification information or biometric information, performing a first authentication process by determining whether of the received one of the identification information or biometric information is stored in the memory, wherein the first authentication process succeeds when the received one of identification information and biometric information is stored in the memory;
when the first authentication process has succeeded, performing a second authentication process upon receipt of the other one of identification information or biometric information by checking whether the other one of identification information or biometric information is stored in the memory in association with the received one of identification information or biometric information, wherein the second authentication process succeeds when the other of identification information and biometric information is stored in the memory in association with the received one of identification information and biometric information;

when the second authentication process has succeeded, enabling a first operation of the image forming system that can be performed only for the authorized users, and when the first authentication process has succeeded upon receipt of the identification information and the second authentication process has failed upon receipt of the biometric information, checking whether the biometric information is stored in another image forming apparatus in association with the received identification information, and when the biometric information is stored in the other image forming apparatus in association with the received identification information, acquire and store in the memory the biometric information in association with the identification information such that the first operation is enabled for a user having the identification information.

\* \* \* \* \*